(12) United States Patent  
Rivera Trevino et al.

(10) Patent No.: US 9,164,859 B2
(45) Date of Patent: Oct. 20, 2015

(54) COMPUTING DEVICE FOR ENABLING CONCURRENT TESTING

(75) Inventors: Gustavo Javier Rivera Trevino, San Diego, CA (US); Michael G Back, San Diego, CA (US); Kelly Jones, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 12/889,117

(22) Filed: Sep. 23, 2010

(65) Prior Publication Data

US 2011/0099424 A1 Apr. 28, 2011

Related U.S. Application Data

(60) Provisional application No. 61/246,024, filed on Sep. 25, 2009.

(51) Int. Cl.
| | |
|---|---|
| *G01R 1/067* | (2006.01) |
| *G01R 1/073* | (2006.01) |
| *G01R 1/20* | (2006.01) |
| *G01R 1/30* | (2006.01) |
| *G06F 11/263* | (2006.01) |

(52) U.S. Cl.
CPC .................................. *G06F 11/263* (2013.01)

(58) Field of Classification Search
CPC .................................................... G06F 11/263
USPC ......... 702/108, 119, 120, 122, 123, 179, 182, 702/183, 189; 703/14; 714/724
See application file for complete search history.

(56) References Cited

U.S. PATENT DOCUMENTS

| | | | | |
|---|---|---|---|---|
| 7,743,304 | B2* | 6/2010 | Volkerink et al. | 714/738 |
| 7,921,344 | B2* | 4/2011 | Serrer | 714/724 |
| 7,930,603 | B2* | 4/2011 | Van Eyck | 714/724 |
| 8,149,901 | B2* | 4/2012 | de la Puente et al. | 375/219 |
| 2007/0013362 | A1 | 1/2007 | Loh et al. | |
| 2009/0119084 | A1* | 5/2009 | Nagashima et al. | 703/14 |

FOREIGN PATENT DOCUMENTS

| | | |
|---|---|---|
| EP | 1092983 A1 | 4/2001 |
| TW | 343294 | 10/1998 |
| TW | 200643441 A | 12/2006 |

OTHER PUBLICATIONS

International Search Report and Written Opinion—PCT/US2010/050415, International Search Authority—European Patent Office—Jan. 14, 2011.
Taiwan Search Report—TW099132714—TIPO—Oct. 21, 2013.
Taiwan Search Report—TW099132714—TIPO—Mar. 18, 2014.

* cited by examiner

*Primary Examiner* — Toan Le
*Assistant Examiner* — Felix Suarez

(57) ABSTRACT

A method for enabling concurrent testing is described. The method includes generating a plurality of test objects on a computing device. The plurality of test objects is generated using derived classes that are based on a base test class and each of the plurality of test objects corresponds to a separate block in a Device Under Test (DUT). The method also includes adding the plurality of test objects to a queue and sending information based on the plurality of test objects to an Automated Test Equipment (ATE). The method also includes causing the ATE to concurrently test the separate blocks in the DUT using the plurality of test objects.

44 Claims, 11 Drawing Sheets

COMPUTING DEVICE FOR ENABLING CONCURRENT TESTING

RELATED APPLICATIONS

This application is related to and claims priority from U.S. Provisional Patent Application Ser. No. 61/246,024 filed Sep. 25, 2009, for "A FRAMEWORK APPROACH TO CONCURRENT TEST METHOD IMPLEMENTATION."

TECHNICAL FIELD

The present disclosure relates generally to electronic devices. More specifically, the present disclosure relates to a computing device for enabling concurrent testing.

BACKGROUND

The use of electronic devices has greatly increased in recent years. For example, people often use cellular phones, smart phones, computers, music players, televisions and gaming systems, among other electronic devices. The use of electronic devices has become so prevalent that these devices are practically ubiquitous in modern society. The decreasing cost of electronic components has particularly encouraged the widespread use of electronic devices.

Electronic devices are often designed and implemented in a modular fashion. For example, an electronic device may include multiple electronic modules or blocks implemented using electronic components and/or integrated circuitry. These modules or blocks typically provide certain functionality used in the operation of the electronic device.

While the use of electronic devices has increased, so has the complexity of available electronic devices. Electronic devices continue to decrease in size, become more power efficient and provide more functionality. A demand exists for electronic devices that provide increased functionality at a decreased cost. With the increased complexity of electronics devices, efficient and cost-effective testing of electronic components (e.g., modules, blocks, etc.) has become a challenge. Thus, systems and methods that allow more efficient and/or cost-effective testing of devices may be beneficial.

SUMMARY

A method for enabling concurrent testing is disclosed. The method includes generating a plurality of test objects on a computing device. The plurality of test objects is generated using derived classes that are based on a base test class and each of the plurality of test objects corresponds to a separate block in a Device Under Test (DUT). The method also includes adding, on the computing device, the plurality of test objects to a queue, sending information based on the plurality of test objects to an Automated Test Equipment (ATE) and causing the ATE to concurrently test the separate blocks in the DUT using the plurality of test objects.

Causing the ATE to concurrently test may include sending an instruction to begin concurrent testing. The method may also include initializing an ATE instrument. The method may also include determining a compatible execution mode for the plurality of test objects. The method may further include performing testing cleanup. The method may additionally include receiving test data. The method may also include performing post-processing. The method may also include performing datalogging.

The method may additionally include disposing of the plurality of test objects. The base test class may include initialization, cleanup, post-processing and datalogging functions that are implemented by the derived classes. The method may also include executing each of the test objects using a separate thread.

The DUT may be an integrated circuit. The plurality of test objects may be generated according to a user interface sequence. The method may further include receiving test data using a background process. The method may also include generating one or more analog sets for use in concurrent testing. The method may additionally include generating one or more digital patterns for use in concurrent testing. The separate blocks may be concurrently tested using Direct Current (DC) tests. The queue may be based on a queue class. The queue class may include a function that controls execution of the test objects in the queue.

A computing device for enabling concurrent testing is also disclosed. The computing device includes a processor and instructions stored in memory. The computing device generates a plurality of test objects. The plurality of test objects is generated using derived classes that are based on a base test class and each of the plurality of test objects corresponds to a separate block in a Device Under Test (DUT). The computing device adds the plurality of test objects to a queue, sends information based on the plurality of test objects to an Automated Test Equipment (ATE) and causes the ATE to concurrently test the separate blocks in the DUT using the plurality of test objects.

A computer-program product for enabling concurrent testing is also disclosed. The computer-program products includes a non-transitory tangible computer-readable medium with instructions. The instructions include code for causing a computing device to generate a plurality of test objects. The plurality of test objects is generated using derived classes that are based on a base test class and each of the plurality of test objects corresponds to a separate block in a Device Under Test (DUT). The instructions also include code for causing the computing device to add the plurality of test objects to a queue, code for causing the computing device to send information based on the plurality of test objects to an Automated Test Equipment (ATE) and code for causing the computing device to cause the ATE to concurrently test the separate blocks in the DUT using the plurality of test objects.

An apparatus for enabling concurrent testing is also disclosed. The apparatus includes means for generating a plurality of test objects. The plurality of test objects is generated using derived classes that are based on a base test class and each of the plurality of test objects corresponds to a separate block in a Device Under Test (DUT). The apparatus also includes means for adding the plurality of test objects to a queue, means for sending information based on the plurality of test objects to an Automated Test Equipment (ATE) and means for causing the ATE to concurrently test the separate blocks in the DUT using the plurality of test objects.

DETAILED DESCRIPTION

Figure 1:
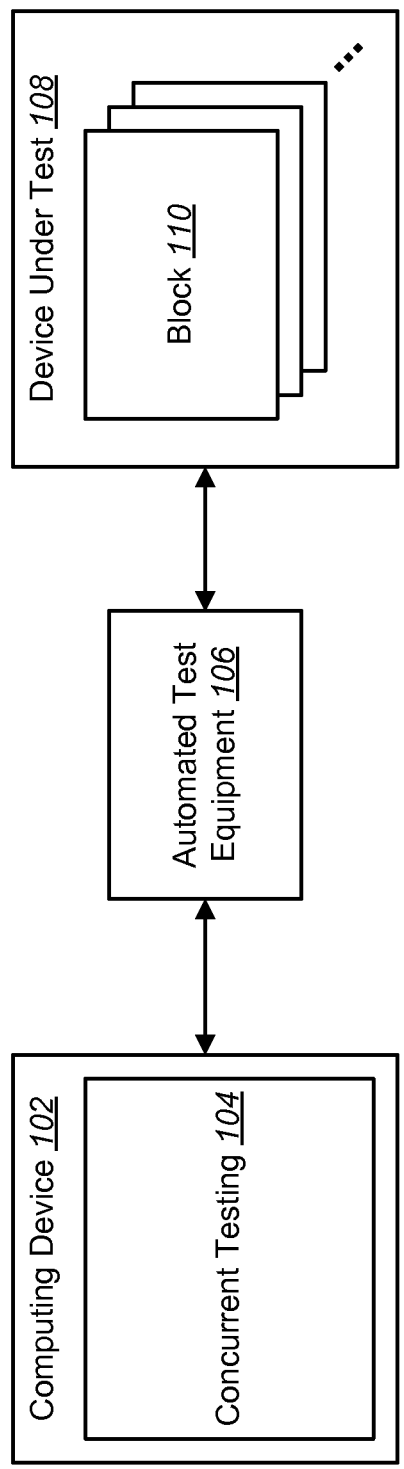
FIG. 1 is a block diagram illustrating one configuration of a computing device for enabling concurrent testing.

The Automated Test Equipment (ATE) industry has been moving toward developing tools to ease concurrent test implementation (i.e., concurrently testing more than one functional block in a device). Several variables around individual tests may be paired together between functional blocks to achieve concurrent execution, such as digital sequencer patterns, ATE analog instruments setup, Device Under Test (DUT) interface board hardware, test-execution sequencing and software test code among others, for example. Concurrent testing may reduce test-time without sacrificing coverage and may reduce the final cost of a product.

The systems and methods disclosed herein may help to overcome challenges that arise while trying to manage diverse pieces of test code for independent functional blocks that are targeted for concurrent test implementation. One example of a platform where the systems and methods disclosed herein may be applied is the Verigy 93K ATE platform. For example, SmarTest software (Verigy's interface to program the 93K) does not currently provide a way to sequence the execution of test code from separate libraries for concurrency applications. Typically, to combine test code for different functional blocks, manual work may be needed to encapsulate all pieces of code under the same function call. An interface (e.g., a "TestFlow" interface) may also need to be modified to account for the combined set of test parameters that a concurrent implementation may need. This approach is far from generic and needs to be repeated for different combinations of tests that a given program may present, leading to duplication of code across all the different function calls needed to cover each possible set of concurrent tests. This approach also makes it difficult to switch between concurrent and standalone execution when trying to isolate issues or correlate data. Managing test programs that implement concurrency then becomes a time-consuming effort, as each time the test program needs to be modified due to yield learning, the sets of grouped concurrent tests may change, requiring the coding of additional functions that cover the newly required test pairings.

To overcome the mentioned issues, the systems and methods disclosed herein provide a programming framework that manages putting together individual pieces of code from different tests in a sequential manner that allows concurrent test execution. The framework may do this dynamically during program run-time, and can combine any number of tests (up to a specified hard coded limit, for example) from different libraries (e.g., "TestMethod" libraries) without requiring the programmer to define each possible combination in advance. Along with the framework comes a set of guidelines that each individual test must follow to structure its code. This structure follows a hierarchical class approach where individual tests are coded as derived classes of a base class that outlines the minimal set of functions that each individual test must define. These functions may comprise, for example, a broken-down version of the different steps that a typical test may follow to set up instruments, measure and post-process data, which allows the generic framework to call each of these "steps" sequentially for each test intended for concurrent execution in a synchronized way. Given that individual tests follow these guidelines, the same set of code may be reusable for either standalone execution or concurrent execution with other tests. This entails code execution and assumes other aspects of the test have already been prepared for concurrent execution (e.g., digital sequencer patterns, ATE analog instruments setup, DUT interface board hardware, etc.). A procedure to sequence execution (in a TestFlow interface, for example) has also been defined to allow easy transition between standalone and concurrent test implantation with reduced effort.

There are many benefits to the systems and methods disclosed herein. For example, the systems and methods disclosed herein may reduce the time and effort required to transition from development to production stages, allow moving back and forth between standalone and concurrent test modes with no code modification and increasing code re-use by modularizing functions and avoiding the need to manually combine code for each different combination of concurrent tests. Furthermore, the systems and methods disclosed herein may facilitate sharing common functions and storage space among related tests through a hierarchical class structure. This may allow a single interface (e.g., "TestFlow" interface) to be reused to execute tests in a standalone or concurrent mode, it may allow standardizing test code development across libraries by defining a set of guidelines and structure to code individual tests and may allow enabling consistent and uniform program behavior across functional blocks by having a framework that sequences code execution in the same way regardless of the block under test.

Previous solutions to program code aimed at concurrent testing consisted of building a new library (e.g., TestMethod library) with functions that mix the individual pieces of code from various tests targeted to be executed concurrently. For each set of tests due for concurrent execution, there would then be a new function to perform them. If a given test was included in more than one set of concurrent tests, the code for that test would be replicated in as many functions as different sets where the test was included. Code duplication grows exponentially in this scheme, becomes hard to maintain when modifications to a test are required and is prone to errors while manually putting together the pieces of code from different tests.

More efficient schemes to attack the problem would break down an individual test into smaller sub-functions, where each of the sub-functions addresses a specific task to perform. The concurrent test code would call the smaller sub-functions for each of the tests intended for concurrent execution. Some manual re-engineering was still required to allow the tests to co-exist together and to select the proper ATE commands that would allow these tests to run in parallel. While code duplication is greatly reduced in that scheme, there was still a considerable amount of manual work required to build the concurrent function calls. Again, a new set of function calls was required for each different combination of concurrent tests. In terms of an interface (e.g., a TestFlow interface), both solutions required the creation of new method (e.g., TestMethod) definitions with the combination of the parameters of the individual tests. The program setup and interface (e.g., TestFlow) also needed to be fully reconstructed to allow standalone to concurrent transition, with no way to move back to standalone testing using the same program.

The improved systems and methods disclosed herein may use concepts of programmatic classes (e.g., C++ classes). These structures may be used to break down and architect test code in such a way that concurrent test execution may be handled by a generic framework. This allows use of the same exact code either for standalone or concurrent execution, regardless of the number or nature of the tests that are paired together. The systems and methods disclosed use a combination of classes (e.g., C++ classes) and a generic framework. One example of the systems and methods disclosed herein is a C++ class-based approach to a concurrent TestMethod implementation in the Verigy 93K ATE using hierarchical classes, a generic framework managing test code execution and an interlaced TestFlow sequencing method.

A more specific and technical example of the systems and methods disclosed herein is provided as follows. While the systems and methods disclosed herein may be applied using the Verigy 93K ATE and the C++ programming language, the systems and methods disclosed herein may be applied using other platforms and/or languages and should not be limited to the implementation illustrated in the following example. The concepts initially illustrated are simplified from an actual implementation and have the purpose of demonstrating and explaining the systems and methods disclosed. For example, C++ pseudo-code without a rigorous syntax may be used for clarity and understanding.

Verigy's software interface to the 93K ATE, SmarTest, provides a development environment that favors test coding into separate libraries. Each library may contain several different TestMethods, which are the main functions a program calls during execution and upon which each individual test is performed. The parameters each of these TestMethods require are specified in the TestFlow, which is the graphical representation SmarTest uses to define the sequence in which different tests are executed. The TestFlow contains individual blocks called TestSuites, which contain the group of setups (e.g., levels, timing, patterns and analog instrument definitions) that may be used to perform a test, as well as the TestMethod and associated parameters that may be used for the test.

As of the latest SmarTest versions available (e.g., 6.1.5, 6.3.5, and 6.5.2), there is no tool or way to easily combine different TestSuites for concurrent test execution. Neither is there a way to structure and pick two or more TestMethod functions such that the related tests could be executed concurrently (assuming that they use independent ATE resources or instruments that could be run in parallel, for example).

Assume, for example, that there are three independent TestMethods that a given program may run concurrently to save test time. Each of them executes a test for a different block in a Device Under Test (DUT). Assume that the blocks are called blocks A, B and C. Further assume that each of the TestMethods takes a set of parameters denoted as PA1, PB1 and PC1, respectively. An example of TestMethod code for blocks A, B and C may be similar to the code illustrated in Table 1.

TABLE 1

| BlckA_Test1_TM(PA1) | BlckB_Test1_TM(PB1) | BlckC_Test1_TM(PC1) |
|---|---|---|
| { | { | { |
| BlckA_Test1_xxx1 | BlckB_Test1_xxx1 | BlckC_Test1_xxx1 |
| BlckA_Test1_xxx2 | BlckB_Test1_xxx2 | BlckC_Test1_xxx2 |
| BlckA_Test1_yyy1 | BlckB_Test1_yyy1 | BlckC_Test1_yyy1 |
| BlckA_Test1_yyy2 | BlckB_Test1_yyy2 | BlckC_Test1_yyy2 |
| BlckA_Test1_exec | BlckB_Test1_exec | BlckC_Test1_exec |
| BlckA_Test1_zzz1 | BlckB_Test1_zzz1 | BlckC_Test1_zzz1 |
| BlckA_Test1_zzz2 | BlckB_Test1_zzz2 | BlckC_Test1_zzz2 |
| } | } | } |

In Table 1, each set _xxx, _yyy and _zzz represents multiple lines of code performing a specific task required for the test, and the _exec depicts a set of generic ATE commands that signal the hardware to actually start performing the test. In this configuration, the _exec may be chosen by the programmer according to the type of ATE resources required for the test. The _xxx and _yyy sets could be considered as setup and initialization code for each test, for example, while _zzz could be related to data post-processing to determine the actual results of the test.

Now, assume that it is desired to perform the following set of tests concurrently: Block A Test 1+Block B Test 1, Block A Test 1+Block C Test 1 and Block A Test 1+Block B Test 1+Block C Test 1. The conventional approach to structure code suggests three different TestMethod functions should be created, each containing the code related for the individual associated tests. Following this approach would lead to code structures similar to the code illustrated in Table 2.

TABLE 2

| BlckAB_Test1_TM(PA1, PB1) | BlckAC_Test1_TM(PA1, PC1) | BlckABC_Test1_TM(PA1, PB1, PC1) |
|---|---|---|
| { | { | { |
| BlckA_Test1_xxx1 | BlckA_Test1_xxx1 | BlckA_Test1_xxx1 |
| BlckA_Test1_xxx2 | BlckA_Test1_xxx2 | BlckA_Test1_xxx2 |
| BlckB_Test1_xxx1 | BlckC_Test1_xxx1 | BlckB_Test1_xxx1 |
| BlckB_Test1_xxx2 | BlckC_Test1_xxx2 | BlckB_Test1_xxx2 |
| BlckA_Test1_yyy1 | BlckA_Test1_yyy1 | BlckC_Test1_xxx1 |
| BlckA_Test1_yyy2 | BlckA_Test1_yyy2 | BlckC_Test1_xxx2 |
| BlckB_Test1_yyy1 | BlckC_Test1_yyy1 | BlckA_Test1_yyy1 |
| BlckB_Test1_yyy2 | BlckC_Test1_yyy2 | BlckA_Test1_yyy2 |
| BlckAB_Test1_exec | BlckAC_Test1_exec | BlckB_Test1_yyy1 |
|  |  | BlckB_Test1_yyy2 |
| BlckA_Test1_zzz1 | BlckA_Test1_zzz1 |  |
| BlckA_Test1_zzz2 | BlckA_Test1_zzz2 | BlckC_Test1_yyy1 |
|  |  | BlckC_Test1_yyy2 |
| BlckB_Test1_zzz1 | BlckC_Test1_zzz1 |  |
| BlckB_Test1_zzz2 | BlckC_Test1_zzz2 | BlckABC_Test1_exec |
| } | } |  |
|  |  | BlckA_Test1_zzz1 |
|  |  | BlckA_Test1_zzz2 |

TABLE 2-continued

BlckB_Test1_zzz1
BlckB_Test1_zzz2
BlckC_Test1_zzz1
BlckC_Test1_zzz2
}

Since the sets of code from the individual functions perform tasks that need to be sequenced in a specific order to communicate with the ATE hardware before and after the test execution, the code for the different functions may be interlaced. Having all of the Block A code followed by the Block B code would lead to a serial rather than a concurrent test execution. This is mainly due to the required code sequencing around the generic set of instructions that communicate with the ATE hardware, depicted here in a single line for simplicity with the _exec set.

Several problems may occur with this approach or architecture and are described as follows. The code may be replicated. More specifically, the same exact lines of code may be repeated over and over across different functions, making it difficult to maintain code and apply modifications when needed.

The code may need to be reengineered. Although code replication is straight forward in most cases, certain test combinations may require investing some time on reengineering the test to make code coming from different standalone TestMethods compatible. The _exec set of instructions, for example, rather than being a transposition of the individual tests' code, will usually turn out to be a new set of instructions compatible for all tests in the concurrent group. Variables' and functions' names may need to be modified too if they are repeated across separate TestMethods. The sequence of the lines of code themselves may also need to be modified if they are not friendly to the structure used by the other TestMethods it is being grouped with.

New TestMethods may be required. The combination of the tests may lead to creating a separate TestMethod function per different set of concurrent tests. This could potentially mean that bigger and more complex programs will result in a very large number of different TestMethods that need to be managed and maintained. New TestFlow interfaces may be required. For instance, each TestSuite may be linked to a specific TestMethod function. The fact that each set of different possible combinations of concurrent tests required a separate TestMethod to parse the parameters and call the test code means that each time the list of tests or their concurrent grouping is modified (during the engineering phase, or later in the production phase due to yield-learning), the TestFlow has to go through major changes to accommodate linking each TestSuite with the associated TestMethod function required for the newly created concurrent test groupings.

It may be difficult to transition between standalone (e.g., serial) and concurrent testing when the systems and methods disclosed herein are not used. Moving back and forth between standalone and concurrent testing implies maintaining two separate TestFlows, since different TestMethods need to be used for each case. Furthermore, the manual replication of code across TestMethods is prone to errors and could lead to different test behavior just because of a lack of synchronization of the code existent in the different TestMethod functions related to the same test.

A concurrent grouping may need to be known in advance. Since each combination of concurrent tests requires a different TestMethod function and interface, the code libraries are not completed until all the different possible sets of concurrent tests are known. This fact also makes it difficult to have a dynamic program scheme where the test lists or pairing changes, since that may lead to a concurrent set of tests for which there is not an available TestMethod function to handle the specific combination. These problems grow exponentially with large and complex programs, as the possible number of different concurrent test combinations increases.

A better way to implement concurrent test code has been used that addresses the described problems to some extent. This approach modularizes the test code into individual functions, keeping in mind the code sequencing required when executing a test. Then, the separate functions (e.g., _xxx( ) _yyy( ) and _zzz( ) can be created and called from the associated TestMethod. An example of what the individual test code may look like is illustrated in Table 3. In Table 3, the columns represent tests for different blocks and the rows represent different functions or methods used in testing.

TABLE 3

| BlckA_Test1_xxx(PA1) | BlckB_Test1_xxx(PB1) | BlckC_Test1_xxx(PC1) |
|---|---|---|
| { | { | { |
| BlckA_Test1_xxx1 | BlckB_Test1_xxx1 | BlckC_Test1_xxx1 |
| BlckA_Test1_xxx2 | BlckB_Test1_xxx2 | BlckC_Test1_xxx2 |
| } | } | } |
| BlckA_Test1_yyy(PA1) | BlckB_Test1_yyy(PB1) | BlckC_Test1_yyy(PC1) |
| { | { | { |
| BlckA_Test1_yyy1 | BlckB_Test1_yyy1 | BlckC_Test1_yyy1 |
| BlckA_Test1_yyy2 | BlckB_Test1_yyy2 | BlckC_Test1_yyy2 |
| } | } | } |
| BlckA_Test1_zzz(PA1) | BlckB_Test1_zzz(PB1) | BlckC_Test1_zzz(PC1) |
| { | { | { |
| BlckA_Test1_zzz1 | BlckB_Test1_zzz1 | BlckC_Test1_zzz1 |
| BlckA_Test1_zzz2 | BlckB_Test1_zzz2 | BlckC_Test1_zzz2 |
| } | } | } |
| BlckA_Test1_TM(PA1) | BlckB_Test1_TM(PB1) | BlckC_Test1_TM(PC1) |
| { | { | { |
| BlckA_Test1_xxx(PA1) | BlckB_Test1_xxx(PB1) | BlckC_Test1_xxx(PC1) |
| BlckA_Test1_yyy(PA1) | BlckB_Test1_yyy(PB1) | BlckC_Test1_yyy(PC1) |
| BlckA_Test1_exec | BlckB_Test1_exec | BlckC_Test1_exec |
| BlckA_Test1_zzz(PA1) | BlckB_Test1_zzz(PB1) | BlckC_Test1_zzz(PC1) |
| } | } | } |

Although this approach may address some of the aforementioned problems, new TestMethods are still required to handle the combinations of different concurrent tests. However, code replication is greatly reduced by having these TestMethods to call centralized functions, where the core of the code resides, allowing modifications to propagate to all the TestMethods related to an individual test.

The TestMethod for the sample three concurrent tests may then be similar to the code illustrated in Table 4. The first column illustrates concurrent tests for blocks A and B, the second for blocks A and C and the third for blocks A, B and C.

TABLE 4

| BlckAB_Test1_TM(PA1, PB1) | BlckAC_Test1_TM(PA1, PC1) | BlckABC_Test1_TM(PA1, PB1, PC1) |
|---|---|---|
| { | { | { |
| BlckA_Test1_xxx(PA1) | BlckA_Test1_xxx(PA1) | BlckA_Test1_xxx(PA1) |
| BlckB_Test1_xxx(PB1) | BlckC_Test1_xxx(PC1) | BlckB_Test1_xxx(PB1) |
| BlckA_Test1_yyy(PA1) | BlckA_Test1_yyy(PA1) | BlckC_Test1_xxx(PC1) |
| BlckB_Test1_yyy(PB1) | BlckC_Test1_yyy(PC1) | BlckA_Test1_yyy(PA1) |
| BlckAB_Test1_exec | BlckAC_Test1_exec | BlckB_Test1_yyy(PB1) |
| BlckA_Test1_zzz(PA1) | BlckA_Test1_zzz(PA1) | BlckC_Test1_yyy(PC1) |
| BlckB_Test1_zzz(PB1) | BlckC_Test1_zzz(PC1) | BlckABC_Test1_exec |
| } | } | BlckA_Test1_zzz(PA1) |
|  |  | BlckB_Test1_zzz(PB1) |
|  |  | BlckC_Test1_zzz(PC1) |
|  |  | } |

While this approach solves the code replication issue, and to some extent the code reengineering problem (assuming function breakdown followed a strict set of rules; although the _exec set still needs to be manually determined for each TestMethod by a programmer), all the other complications mentioned for the conventional approach still affect this approach or architecture.

The improved systems and methods disclosed herein may use a class-based and generic framework approach. This approach addresses all of the problems described above in regards to TestMethod coding. For instance, suppose a generic class ConcTest is created, which declares pure virtual functions _xxx( ) _yyy( ) and _zzz( ) It also declares a class member exec_mode whose value will indicate the type of hardware resource utilized by a test. The ConcTest class is illustrated in Listing 1 below.

Listing 1

```
class ConcTest
{
exec_mode = 0
xxx( ) = 0
yyy( ) = 0
zzz( ) = 0
}
```

A separate class ConcQueue is also created which contains an array of pointers to ConcTest objects. An instance of this class will serve as a container for the different tests that are to be going executed concurrently at a time. This class additionally defines member functions that allow adding ConcTest objects to the container array and to execute the code for all objects existent in the container. Since the add functionality allows keeping storing objects in the container until execution, it serves as a queue or poll for tests due for concurrent execution. This class may additionally define other private member functions and variables to perform internal tasks. The ConcTest class is illustrated in Listing 2.

Listing 2

```
class ConcQueue
{
concTests[10]
count = 0
exec_mode = 0
add(T) {
  concTests[count] = T
  count = count +1 }
combExe(CTexec) {
  //Changes exec_mode into a mode
  //compatible with CTexec }
conc_exec( ) {
  // Performs execution command
  // according to exec_mode }
exec(exec_now) {
  if(!(exec_now)) exit;
  for(i=0; i<count; i++)
    concTests[i].xxx( )
  for(i=0; i<count; i++)
    concTests[i].yyy( )
  for(i=0; i<count; i++)
    combExe(concTests[i].exec_mode)
  conc_exec( )
  for(i=0; i<count; i++)
    concTests[i].zzz( )
  for(i=0; i<count; i++)
    delete concTests[i]
  count = 0 }
}
```

The code of individual tests is encapsulated inside classes derived from or upon the ConcTest base class. Since the ConcTest class declared its member functions as pure virtual, derived classes must define each of these functions. This enforces structure compliance into all the newly created test classes. TestMethods for the individual tests are then reduced to perform the following tasks: create an instance of the target test class, initialize its member variables according to the TestMethod parameters, add the newly created object to the ConcQueue container and give control of code execution to the ConcQueue class. Examples of this structure are illustrated in Table 5.

TABLE 5

| class BlckA_Test1:ConcTest | BlckB_Test1:ConcTest | BlckC_Test1:ConcTest |
|---|---|---|
| { | { | { |
| exec_mode = A | exec_mode = B | exec_mode = C |
| PA1 = 0 | PB1 = 0 | PC1 = 0 |
| xxx( ) { | xxx( ) { | xxx( ) { |
| BlckA_Test1_xxx1 | BlckB_Test1_xxx1 | BlckC_Test1_xxx1 |
| BlckA_Test1_xxx2} | BlckB_Test1_xxx2} | BlckC_Test1_xxx2} |
| yyy( ) { | yyy( ) { | yyy( ) { |
| BlckA_Test1_yyy1 | BlckB_Test1_yyy1 | BlckC_Test1_yyy1 |
| BlckA_Test1_yyy2} | BlckB_Test1_yyy2} | BlckC_Test1_yyy2} |
| zzz( ) { | zzz( ) { | zzz( ) { |

TABLE 5-continued

| | | |
|---|---|---|
| BlckA_Test1_zzz1 | BlckB_Test1_zzz1 | BlckC_Test1_zzz1 |
| BlckA_Test1_zzz2} | BlckB_Test1_zzz2} | BlckC_Test1_zzz2} |
| } | } | } |
| BlckA_Test1_TM(PA1) | BlckB_Test1_TM(PB1) | BlckC_Test1_TM(PC1) |
| { | { | { |
| ConcTest T = new BlckA_Test1 | ConcTest T = new BlckB_Test1 | ConcTest T = new BlckC_Test1 |
| T.PA1 = PA1 | T.PB1 = PB1 | T.PC1 = PC1 |
| ConcQueue.add(T) | ConcQueue.add(T) | ConcQueue.add(T) |
| ConcQueue.exec( GLOBAL_EXEC) | ConcQueue.exec( GLOBAL_EXEC) | ConcQueue.exec( GLOBAL_EXEC) |
| } | } | } |

GLOBAL_EXEC is a flag that signals whether to execute the test immediately or just hold the object in the queue and wait for later execution concurrently with other queued tests. Having this GLOBAL_EXEC flag defined as a TestFlow flag allows easy back-and-forth transition between concurrent and standalone (e.g., serial) test execution. It also allows "hybrid" TestFlows, where both schemes are used by changing this flag during program execution. The logic to handle this flag may optionally be integrated in the ConcQueue class, but is shown differently here for simplicity in illustration.

An additional TestMethod could be created that forces the execution of all test objects present in the ConcQueue container. This code is illustrated in Listing 3.

Listing 3

```
Exec_Conc_TM( )
{
ConcQueue.exec(1)
}
```

This code architecture can be combined with an interlaced TestFlow format to sequence concurrent test execution while still allowing switching back to a standalone scheme in the same TestFlow by modifying the GLOBAL_EXEC flag. More detail regarding this TestFlow format is given below.

The systems and methods described herein solve each of the different problems cited above as follows. Code replication: code is centralized in a single location inside the test class definition. From there, it is accessible to the generic framework or any other programming architecture that needs to access it. Furthermore, the class-based approach allows defining "parent" classes with functions that are common to a subset of related test classes, increasing code reutilization. The use of the ConcQueue framework also centralizes code structure and the ConcTest class permits the definition of functions or variables accessible to all derived classes.

Code reengineering: following a set of guidelines and a predefined format to break down tests into smaller functions allows standardizing the test classes. This makes it possible for the ConcQueue framework to combine and seamlessly execute any combination of concurrent tests (assuming the ATE setups are properly structured and the DUT provides access to the various functional blocks under execution, for example). The reengineering function of combining the tests is then pushed to the framework and all the logic and considerations can be implemented there.

New TestMethods required: under this scheme, the TestMethod is used as a mere interface to initialize and queue the test object. No additional TestMethod definitions are required for each set of concurrent tests. A single TestMethod (e.g., Exec_Conc_TM( ) TestMethod) is enough to execute any set of concurrent tests after they have been initialized through the TestMethod interfaces.

New TestFlow interfaces required: since the TestMethod parameters are unchanged by this approach, there is no need to create new TestSuite interfaces whenever a new set of concurrent tests are introduced. Only the Exec_Conc_TM( ) TestSuite is required to force execution of queued tests.

Troublesome transition between standalone and concurrent testing: by using the GLOBAL_EXEC TestFlow flag approach discussed earlier, individual tests can be executed "in-place" without having to wait to reach the Exec_Conc_TM( ) TestSuite, allowing an easy transition between standalone and concurrent execution in the same TestFlow. In other words, the systems and methods disclosed herein enable tests to be performed serially (one after another) or concurrently without substantial recoding. This may be done at the option of the user. For example, tests (e.g., test objects) in the queue may be serially executable and/or concurrently executable without rewriting code.

There is no need to know concurrent grouping in advance since the framework sequences the code execution for all and any set of test objects queued. Thus, the selection of tests can dynamically vary without having to provide code in advance to control each different combination.

Typically, initial test program development may be performed in blocks, where different people work on the independent blocks of the same device. When a test program is needed, an "integration" engineer merges together the individual pieces and comes up with a serial sequence of tests for the different blocks. Devices may be tested in-house and overseas, and as yield learning progresses or new requirements come, the program is modified. Concurrent testing refers to the action of testing two or more blocks of a device in parallel. In some configurations, concurrent testing may use multiple instruments and data processing code routines. The term "concurrent" and other variations thereof as used herein may mean that the performance of at least two operations or tests may overlap each other in time. For example, a first block and a second block may be concurrently tested when their tests overlap in time. Concurrent and other variations thereof may optionally mean that at least two operations begin at the same time or simultaneously. Furthermore, concurrent and other variations thereof may optionally mean that at least two operations are being performed synchronously.

Concurrent testing may assume that a device test mode has simultaneous access to separate blocks, that an ATE has enough instruments to perform tests in parallel and that the ATE software allows running independent tests at the same time. Concurrent testing may better approach the device's final application, since blocks run simultaneously on a device. Concurrent testing may reduce test time, which may impact final cost.

Some Automated Test Equipment (ATE) may allow concurrent testing. For example, the Verigy 93K ATE may have a "multi-port" structure to execute independent patterns in parallel and the ability to run separate instruments in parallel. However, there may be no means to execute independent TestMethod code concurrently, no way to synchronize the instruments' setup and execution tasks across independent tests and no interface to select multiple existent serial tests to switch them to concurrent execution. For instance, it should be noted that SmartCalc II (introduced in version 6.5.2) is not a concurrency solution. Its purpose is to allow code execution in parallel with the next test's capture.

In general, each TestSuite may be linked to a single Test-Method and contains its test parameters. During program development, each TestMethod may contain code specific for a single test of a particular block (e.g., device block).

Some existing workarounds for TestMethod concurrency consist of creating a new "combo" TestMethod with code for two or more blocks' tests. This may include mostly code replication with some reengineering required. In this approach, when a new TestMethod is created, the TestFlow needs to change to link to it. Thus, serial and concurrent TestMethods are no longer compatible using this approach. Some of the issues with this approach may include code replication, code reengineering, requiring new TestMethod definitions, requiring a new TestFlow, a troublesome transition between serial and concurrent testing and a need to know concurrent grouping in advance.

Another "enhanced" workaround has been used. Using this approach, code for each test is concentrated in a library and split into smaller functions for the different tasks commonly performed (e.g., instrument setup, datapost processing, etc.). Furthermore, the TestMethod controls sequencing and calls the library functions for a given test. Also, concurrent TestMethod definitions may call the code for multiple blocks in order from their corresponding libraries. This approach solves to a good extent code replication and reengineering problems. However, other listed problems still remain (e.g., new TestMethod definitions required, new TestFlow required, troublesome transition between serial and concurrent testing and a need to know concurrent grouping in advance).

According to the systems and methods disclosed herein, however, code for each test may be concentrated in a class and split into smaller member functions common to all tests (e.g., instrument setup, data post-process, etc.). Using this approach, the TestMethod creates a new instance of the desired class and adds it into a "queue" object. The queue object accumulates instances of the called test classes. When the queue is forced to execute, the member functions for each test class instance accumulated are called in a sequenced manner. A TestFlow flag controls if the queue should execute immediately (e.g., serially) or accumulate (for concurrent execution, for example). The systems and methods disclosed herein alleviate the aforementioned issues of no means to execute independent TestMethod code concurrently, no way to synchronize the instruments' setup and execution tasks across independent tests and no interface to select multiple existent serial tests to switch them to concurrent execution.

Furthermore, the systems and methods disclosed herein alleviate the code maintenance problems, such as code replication, code reengineering, requiring new TestMethod definitions, requiring a new TestFlow, the troublesome transition between serial and concurrent testing and the need to know concurrent grouping in advance.

Some additional features of the systems and methods disclosed herein may include TMLimits and unified datalog support (including correlation factors), TMLimits file auto-generation, multi-bin support, multi-site support and task test support (for a Parametric Measurement Unit (PMU), Serial Parametric Measurement Unit (SPMU) and Device Power Supply (DPS)). It should be noted that the terms "function" and "method" may be used interchangeably herein.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a computing device 102 for enabling concurrent testing. Examples of computing devices 102 include desktop computers, workstations, laptop computers, or other electronic devices including a processor and memory. The computing device 102 may communicate with an Automated Test Equipment (ATE) 106. The ATE 106 may be a device that communicates with and/or tests one or more Devices Under Test (DUTs) 108. The ATE 106 may include one or more instruments used to generate signals, instructions and/or other information for testing the DUT 108. For example, the ATE 106 may send instructions, signals and/or other messages to the DUT 108 in order to test one or more functional blocks 110 on the DUT 108. The ATE 106 may receive messages, test results and/or measurements from the DUT 108.

The DUT 108 is a device that may be tested by the ATE 106. Examples of the DUT 108 include integrated circuits, circuit wafers, electronic devices, wireless communication devices (e.g., cellular phones, smart phones, etc.) and/or other devices, components and/or circuitry that may be tested. For instance, the DUT 108 may be an object that is desirably tested concurrently, such as an integrated circuit or a group of integrated circuits that may be beneficially tested concurrently. More specifically, for example, the DUT 108 may be an integrated circuit. The DUT 108 may include one or more functional blocks 110. Functional blocks 110 may be components of the DUT 108. For example, a function block 110 may comprise hardware and/or software that provides some functionality to the DUT 108. One example of a block 110 is a receiver circuit for a cellular phone. It should be noted that blocks 110 may additionally or alternatively comprise one or more integrated circuits.

The ATE 106 may be capable of concurrently testing multiple functional blocks 110. For example, the ATE 106 may include one or more instruments that are able to independently test multiple functional blocks 110. For instance, the ATE 106 may send instructions and/or signals to multiple functional blocks 110 in parallel and/or the ATE 106 may receive test results, messages or other information from multiple functional blocks 110 in parallel. The ATE 106 may test multiple functional blocks 110 concurrently. For example, the time range in which one test is performed may overlap with the time range in which another test is performed. In some configurations, the multiple tests may begin at the same time.

The computing device 102 may enable concurrent testing. The computing device 102 may include a concurrent testing module 104. The concurrent testing module 104 may be implemented using software, hardware or a combination of both. For example, the concurrent testing module 104 may provide a framework and/or class-based structure for generating tests (e.g., test objects) that the ATE 106 may run concurrently. For instance, the concurrent testing module 104 may generate multiple test objects that individually correspond to multiple functional blocks 110. Each of these test objects may be generated using derived test classes that are based on a base test class. These test objects may be placed into a queue for concurrent execution. For example, the computing device 102 may send information (e.g., messages, instructions, etc.) to the ATE 106 based on the test objects. This information may indicate to the ATE 106, for example, which of the functional blocks 110 are to be tested, what test signals and/or patterns to use in testing, etc. The computing device 102 may then cause the ATE 106 to begin concurrent testing. For instance, the computing device 102 sends a message to the ATE 106 instructing it 106 to begin concurrent testing (for each of the relevant functional blocks 110, for example). The tests that may be executed or concurrently performed may include any of digital, mixed signal, Radio Frequency (RF) and Direct Current (DC) tests, for example.

Figure 2:
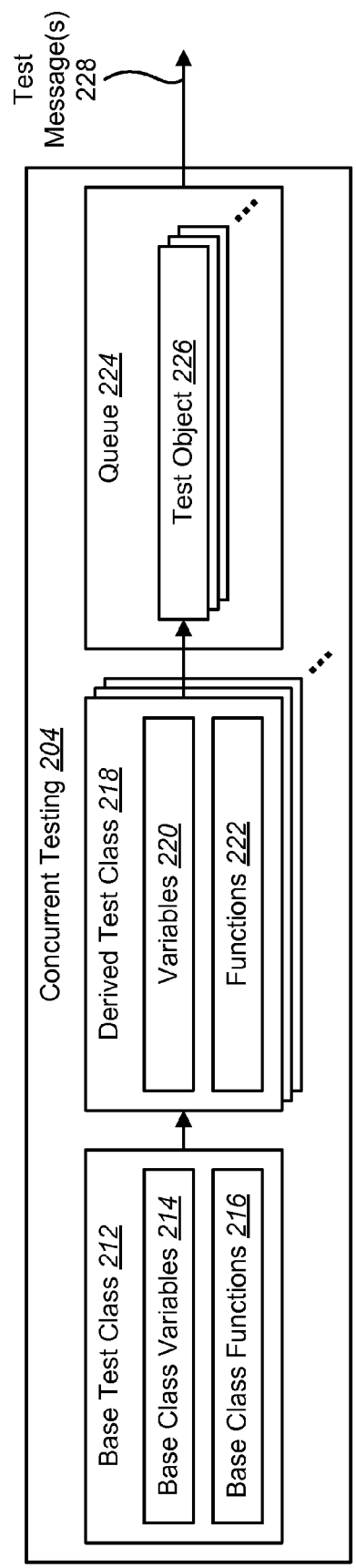
FIG. 2 is a block diagram illustrating one configuration of a concurrent testing module.

FIG. 2 is a block diagram illustrating one configuration of a concurrent testing module 204. The concurrent testing module 204 may provide a framework for concurrent testing. The concurrent testing module 204 may include a base test class 212. The base test class 212 may include one or more base class variables 214 and/or one or more base class functions (or "methods") 216. One or more derived test classes 218 may inherit the base class variables 214 and/or the base class functions 216 from the base test class 212. In other words, the one or more derived test classes 218 may be based on the base test class 212. In some configurations, the base test class 212 may be an "abstract" class.

Each of the derived test classes 218 may correspond to a particular block 110 on a DUT 108. For example, each of the derived test classes 218 may include variables 220 and/or functions 222 that may be used to test a block 110 on the DUT 108. For instance, one or more of the variables 220 and/or functions 222 may be specifically applied to a block 110. In some configurations, these variables 220 and/or functions 222 that are specific to a particular block 110 may be included within functions 222 that are inherited from the base test class 212 and/or based on base class functions 216. More specifically, some of the functions 222 may be based on base class functions 216 and provide a structure that functions 222 specific to a particular block 110 are inserted into. For example, a derived test class 218 may include several functions 222 and/or variables 220 that are used to initialize instruments on an ATE 106 for testing a particular block 110. These functions 222 and/or variables 218 may be placed within an initialization function 222 that is inherited from the base test class 212 and/or based on a base class initialization function 216.

The one or more derived test classes 218 may use one or more of the base class variables 214 as variables 220. For example, the one or more derived test classes 218 may inherit and/or operate using variables 220 that are based on the base class variables 214. The base class variables 214 may include variables that are used by each derived test class 218. A derived test class 218 may also include and/or use other variables 220 that are not inherited from the base test class 212 and/or that are not based on the base class variables 214.

The one or more derived test classes 218 may additionally or alternatively include one or more functions 222 that are inherited from the base test class 212 and/or are based on the base class functions 216. In one configuration, for example, the base test class 212 may include one or more base class functions 216 that are "pure virtual functions." For instance, the one or more derived test classes 218 may be required to implement (e.g., provide operational code for) one or more "pure virtual" base class functions 216 in its one or more functions 222. This approach may be beneficial, in that it may require derived test classes 218 to conform to a particular structure. A derived test class 218 may include one or more functions 222 that are not inherited from the base test class 212 and/or are not based on the base class functions 216.

Each of the derived test classes 218 may be instantiated or constructed into test objects 226. For example, a computing device 102 may generate one or more test objects 226 based on the one or more derived test classes 218. Each of the test objects 226 may be added to a queue object 224. The queue object 224 may be based on a "queue" class (similar to the ConcQueue class described above, for example). The class may be a "container" class or serve as a container. In other words, the queue object 224 may hold one or more test objects 226. The test objects 226 may be held by the queue object 224 for concurrent testing. For example, test objects 226 may be placed within the queue object 224 as they are generated. Tests based on the test objects 226 in the queue object 224 may then be executed concurrently. For instance, the concurrent testing module 204 may send one or more test message(s) 228 (e.g., information based on the test objects 226 in the queue object 224) to the ATE 106 in order to concurrently run tests based on the test objects 226. For example, the one or more test messages 228 may include commands, function calls, instructions, data and/or other information. In one configuration, the queue class may also include a function or method that controls concurrent execution. For example, when queue class' exec( ) function is called, the computing device 102 may cause the ATE 106 to concurrently run tests based on all of the test objects 226 in the queue 228.

In one configuration, the base test class 212, the derived test classes 218 and the queue object 224 may be implemented using the C++ programming language. For clarity in explanation and understanding, more detail regarding the C++ programming language is given hereafter. However, the systems and methods disclosed herein need not use C++, but may use some other programming language. Accordingly, the scope of the disclosure should not be limited to the C++ programming language.

In C++, functions and variables are declared and defined. A declaration is a description of the data type that the variable or function may operate on. The definition codes the actual implementation of this variable or function. It may be good practice to separate declarations and definitions in two separate sections. This approach provides a top-level summary of all the variables and functions used in a code module.

In C++, header files (with an .h extension) are used to encapsulate the declarations of functions and variables used by a module. The actual implementation of each of those variables and functions may be defined separately in a source file (with a .cpp extension). When a programmer chooses to use a module with their code, they may only need to look at the header file to briefly see all the functionality the module provides.

Instructions starting with a pound sign (#) are compiler directives, processed only at compile time. Declaration scope refers to the block of code where a variable or function is recognized and can be used. The place where a variable or function is declared determines its scope. For example, global scope is defined outside of other functions or classes, while local scope may be defined inside a bracketed function.

A class may be a collection of functions, variables and constants (called class members) that are grouped together as a single entity and may be related to a common task or set of data. The class name can be used as a new data type. An object is an instance of a class. Many objects can be created using a single class definition. Each object may contain its own independent copy of all the members declared for the class it belongs to.

All classes typically contain at least two functions: a constructor and a destructor. These functions are called whenever an object is created (e.g., declared) and destroyed (when the program reaches the end of the object scope or is explicitly deleted, for example). These functions take the same name as the class and the destructor is preceded by a tilde (~).

It may be a good practice to declare classes in header files and define their class members in a separate source file. Declaring two functions with the same name but with a different type or number of parameters is overloading a function.

Static class member are shared across all the objects for that class, therefore there is not an independent copy of these members for each object. These could be considered to have a "global" scope. Static functions cannot operate on non-static class members.

Derived classes are those classes created based on an existing base class declaration. Derived classes inherit the definition of all of the declared members of the base class (except the constructor and destructor, for example). The constructor and destructor of the base class may be executed on top of those of the derived class in the following sequence: base class constructor, derived class constructor, object's life span, derived class destructor and base class destructor.

Member functions may be redefined to override the behavior of the base class if they are declared as virtual functions. Pure virtual functions can be declared in an abstract base class, forcing all derived classes to define these functions. Class members may be assigned a different scope level (e.g., public, protected or private). This determines whether the class members can be accessed or not from outside the class.

Figure 3:
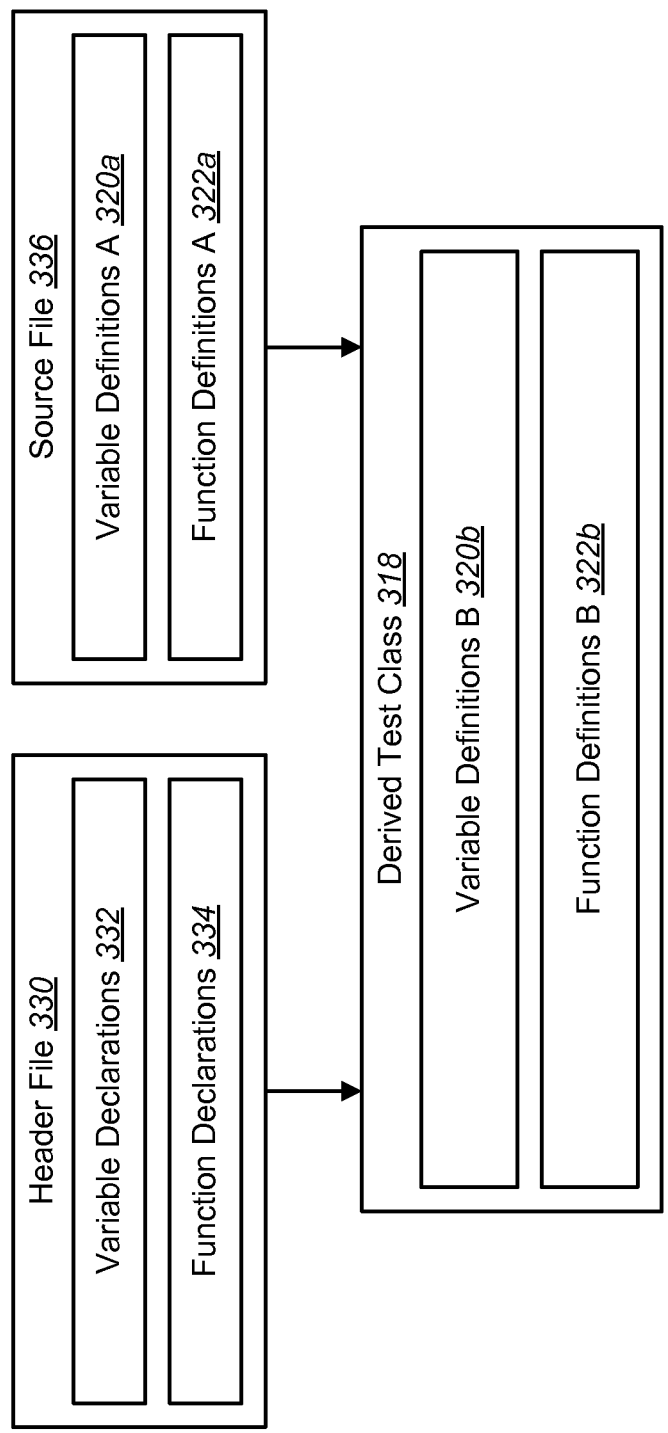
FIG. 3 is a block diagram illustrating one configuration of a derived test class.

FIG. 3 is a block diagram illustrating one configuration of a derived test class 318. In this configuration, the derived test class 318 comprises information from a header file 330 and a source file 336. The header file 330 may include variable declarations 332 and/or function declarations 334. The source file 336 may include variable definitions A 320*a* and/or function definitions A 322*a*. The derived test class 318 may use the information from the header file 330 and/or the source file 336. For example, the derived test class 318 may incorporate the variable declarations 332, function declarations 334, variable definitions A 320*a* and/or functions definitions A 322*a* from the header file 330 and/or the source file 336 for its 318 variable definitions B 320*b* and/or function definitions B 322*b*. In C++, for example, the header file 330 may be an .h file and the source file 336 may be a .cpp file. Thus, the derived test class 318 may comprise information from a header file 330 and/or a source file 336.

Figure 4:
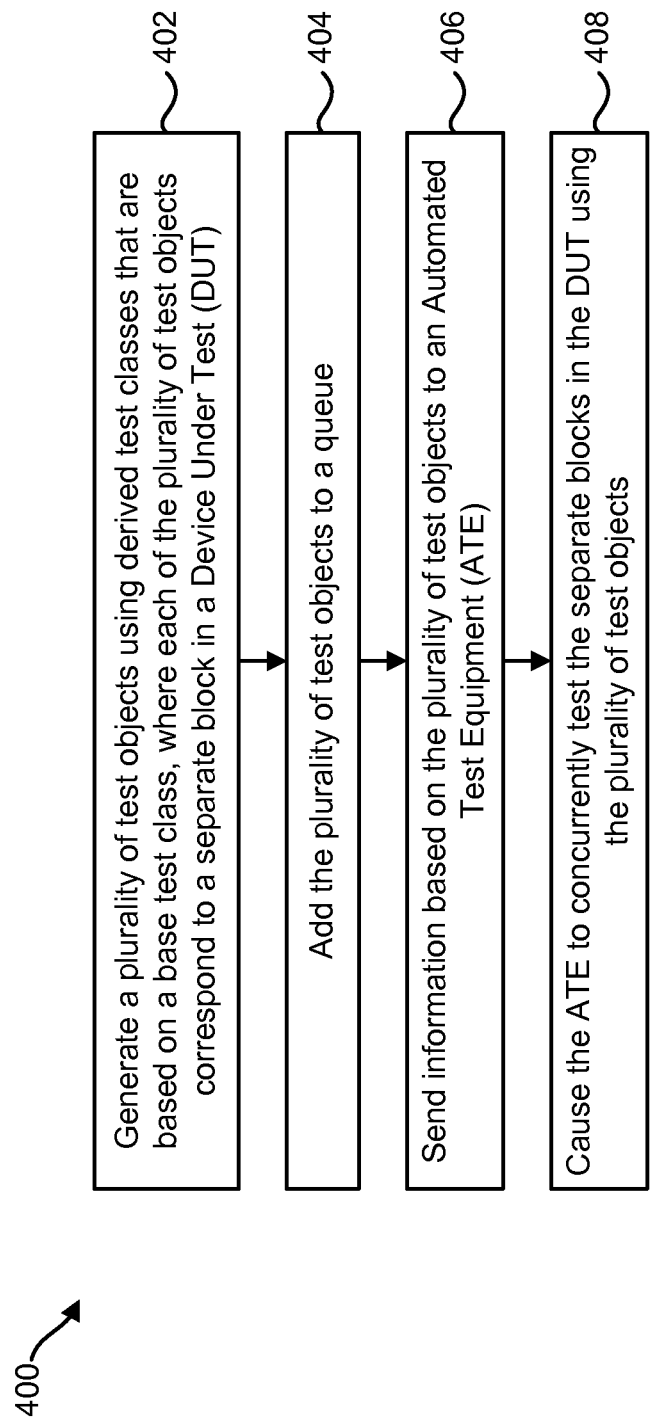
FIG. 4 is a flow diagram illustrating one configuration of a method for enabling concurrent testing.

FIG. 4 is a flow diagram illustrating one configuration of a method 400 for enabling concurrent testing. A computing device 102 may generate 402 a plurality of test objects 226 using derived test classes 218 that are based on a base test class 212. Each of the plurality of test objects 226 may correspond to a separate block 110 in a DUT 108. As described above, a concurrent testing module 204 may include several derived test classes 218 that are based on a base test class 212. The computing device 102 may generate 402 these test objects 226 by instantiating the derived test classes 218.

The computing device 102 may add 404 the plurality of test objects 226 to a queue (object) 224. For example, the computing device 102 may generate and/or include a queue object 224 that may hold or include one or more test objects 226. As the plurality of test objects 226 are generated 402, they may be added 404 to this queue object 224.

The computing device 102 may send 406 information based on the plurality of test objects 226 to an ATE 106. For example, the computing device 102 may send 406 one or more test message(s) 228 based on the test objects 226. For instance, the computing device 102 may send 406 one or more function calls, instructions, variable values, data and/or other information to the ATE 106 based on the test objects 226. In one configuration, the computing device 102 may send 406 the test objects 226 to the ATE 106. The test message(s) 228 and/or test objects 226 may be formatted for transmission. For instance, the computing device 102 may format the information for transmission using Transmission Control Protocol (TCP), Internet Protocol (IP), User Datagram Protocol (UDP), Ethernet, Universal Serial Bus (USB) and/or other protocols and send 406 the information accordingly. It should be noted that communications between the computing device 102 and ATE 106 may use wired and/or wireless communication technologies, such as Ethernet, USB, infrared, Institute of Electronics and Electrical Engineers (IEEE) 802.11 ("Wi-Fi"), IEEE 802.16 ("WiMAX") and/or $3^{rd}$ Generation Partnership Project (3GPP) technologies, etc.

The computing device 102 may cause 408 the ATE 106 to concurrently test the separate blocks 110 in the DUT 108 using the plurality of test objects 226. For example, the computing device 102 may send a command and/or function call to the ATE 106 in order to begin concurrent testing of the DUT 108 blocks 110. This may cause 408 the ATE 106 to concurrently test separate blocks 110 based on the test objects 226. For instance, the ATE 106 may receive a command that causes 408 it 106 to concurrently test multiple blocks 110 by sending test signals and/or communications to the DUT 108 and/or by receiving test results or data from the DUT 108. These concurrent tests may be done in accordance with the test objects 226. For example, the ATE 106 may test those blocks 110 corresponding to the test objects 226 according to instructions that are based on the test objects 226.

Figure 5:
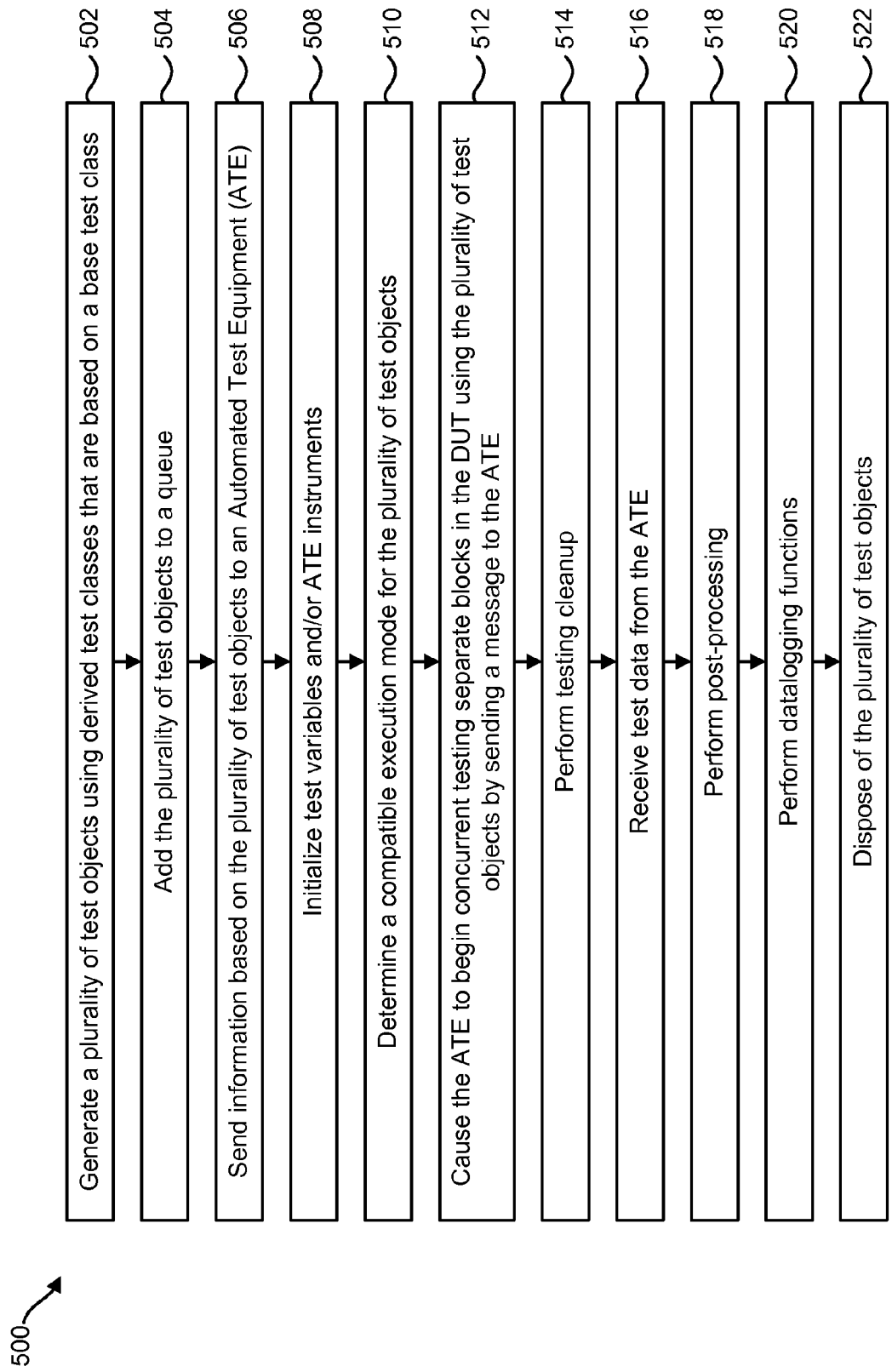
FIG. 5 is a flow diagram illustrating a more detailed configuration of a method for enabling concurrent testing.

FIG. 5 is a flow diagram illustrating a more detailed configuration of a method 500 for enabling concurrent testing. A computing device 102 may generate 502 a plurality of test objects 226 using derived test classes 218 that are based on a base test class 212. For example, the computing device 102 may instantiate multiple derived test classes 218. When the test objects 226 are generated 502, parameters used by the concurrent testing module 204 may be initialized. As described above, each of the plurality of test objects 226 may correspond to separate blocks 110 in a DUT 108.

The computing device 102 may add 504 the plurality of test objects 226 to a queue (object) 224. For example, the computing device 102 may generate and/or include a queue object 224 that may hold or include one or more test objects 226. As the plurality of test objects 226 are generated 502, they may be added 504 to this queue object 224.

The computing device 102 may send 506 information based on the plurality of test objects 226 to an ATE 106. For example, the computing device 102 may send 506 one or more test message(s) 228 based on the test objects 226. For instance, the computing device 102 may send 506 one or more function calls, instructions, variable values, data and/or other information to the ATE 106 based on the test objects 226. In one configuration, the computing device 102 may send 506 the test objects 226 to the ATE 106. The test message(s) 228 and/or test objects 226 may be formatted for transmission. It should be noted that sending 506 information based on the test objects 226 to the ATE 106 may be performed independently and/or as part of some of the following method 500 steps.

The computing device 102 may initialize 508 test variables and/or ATE instruments. For example, the computing device 102 may set variable values in order to perform the tests. The computing device 102 may additionally or alternatively initialize one or more ATE instruments for performing a test. For example, the computing device 102 may send information to the ATE 106 that causes the ATE 106 to prepare one or more of its instruments for testing. This information may include function calls, variable values and/or other data.

The computing device 102 may determine 510 a compatible execution mode for the plurality of test objects 226. For example, different test objects 226 (for different tests and/or blocks 110, for example) may use particular execution modes. In order for concurrent testing to function properly, the computing device 102 may determine 510 an execution mode that is compatible with each of the tests to be concurrently executed.

For example, the computing device 102 (e.g., the framework) may use the "exec_mode" member variable depicted in Listing 1 and inherited by all derived test classes 218 to determine 510 a single command to execute that will allow compatible execution for all the tests in the queue 224. Each test class 218 may override the 0 default value given to this member variable before the program attempts to execute the ConcQueue.exec( ) function illustrated in Listing 2.

In one configuration, for example, the Verigy 93K set of C++ Application Programming Interfaces (APIs) has different commands that will trigger the start of test execution. Each of these commands has a slightly different behavior. Depending on the instruments required on a given test and the type of measurement to be performed, a different command may need to be selected. Two basic command modes can be defined: blocking and non-blocking.

A blocking type of command will stop program execution until the digital sequencer and analog sequencers have finished running their programmed tasks (e.g., digital patterns have been completely executed, digitizers have captured all requested data, Arbitrary Waveform Generators (AWGs) have driven the programmed waveforms to the device, etc.). This type of command is needed when the code following is meant to work on the captured data (e.g., post-processing), thus requiring that all instruments have finished execution before proceeding.

A non-blocking type of command will kick start the digital sequencer and analog instruments, and the program execution will continue right after even if these instruments are still busy performing the programmed tasks. This behavior may be needed when some special commands are sent to the instruments after the test start (e.g., software triggering sequences controlled in the program execution) or when test efficiency might be benefited by running processing routines in the background while ATE instruments are busy.

Some examples of actual commands in the Verigy 93K follow. EXECUTE_TEST( ) starts the digital sequencer and prepares analog instruments for test execution; this command is a blocking type of command. START_TEST( ) is the same as EXECUTE_TEST( ) but has a "non-blocking" behavior. DIGITAL_CAPTURE_TEST( ) is the same as EXECUTE_TEST, but additionally prepares the ATE to capture streams of digital data coming from the DUT. NB_DIGITAL_CAPTURE_TEST( ) is a non-blocking version of the DIGITAL_CAPTURE_TEST( ) command. EXECUTE_GROUP( ) is a blocking type of command that will start the digital sequencer and execute a software trigger program to control Radio Frequency (RF) and analog instruments. TASK.execute( ) executes a pre-programmed set of Direct Current (DC) measurements.

The computing device 102 may cause 512 the ATE 106 to begin concurrently testing the separate blocks 110 in the DUT 108 using the plurality of test objects 226. For example, the computing device 102 may send one or more commands and/or function calls to the ATE 106 in order to begin concurrent testing of the DUT 108 blocks 110. This may cause 512 the ATE 106 to concurrently test separate blocks 110 based on the test objects 226. For instance, the ATE 106 may receive a command that causes 512 it to concurrently test multiple blocks 110 by sending test signals and/or communications to the DUT 108 and/or by receiving or measuring test results or data from the DUT 108. These concurrent tests may be done in accordance with the test objects 226. For example, the ATE 106 may test those blocks 110 corresponding to the test objects 226 according to instructions that are based on the test objects 226.

The computing device 102 may perform 514 testing cleanup. In one configuration, the computing device 102 may perform 514 testing cleanup by disabling triggers and restoring the original state of the ATE instruments. For example, the computing device 102 may send a message, a command, a function call, instructions, data and/or other information that causes the ATE 106 to restore its instruments back to their original state before testing.

For example, ATE instruments may feature a trigger line to control and sequence the tasks performed by the instrument. This is particularly helpful when synchronization is required between the DUT 108 and the instrument. For example, the digital sequencer will send a digital pattern to the DUT 108 to program it into a certain mode. An analog measurement performed on a signal coming from the DUT 108 might be invalid if it is captured too early in this sequence (e.g., before the DUT 108 is fully programmed). A typical test may then include a trigger signal in the digital pattern which drives a trace line connected to the trigger channel on a given ATE instrument, such that this signal could be "fired" inside the digital pattern in the proper sequence after the DUT 108 has been programmed. Complex tests may even require more than one trigger per instrument, or multiple triggers going to different instruments.

When setting up a test, before the execution command (e.g., one of the commands described above) is issued, the instruments may need to be programmed to either accept trigger signals (e.g., hardware (HW) triggering), or to just wait for a trigger coming from the program code (e.g., software (SW) triggering). When hardware triggering is to be performed (once the test is completed), it may be a good practice to disable the hardware trigger until another test requires it again. This practice prevents the instrument from false-triggering due to noise in the trigger channel lines. This hardware triggering disabling may be one example of the "cleanup" functions described above.

Other cleanup functions may be related to programming a given instrument back to a "default" state. A given test might need a Direct Current (DC) channel to drive certain voltage. However, once the test is completed, it may be a good practice to restore the original level for this DC channel. This may be another example of a cleanup kind of task.

The computing device 102 may receive 516 test data from the ATE 106. For example, the computing device 102 may receive test measurements, data, messages and/or other information from the ATE 106 regarding the tests performed. For instance, the ATE 106 may send signal measurements (e.g., amplitude, phase, frequency, voltage, current, delay, samples, etc.), block outputs, messages (e.g., digital messages, outputs, failures, etc.) and/or other measurements or test results. These may be received 516 by the computing device 102.

The computing device 102 may perform 518 post-processing. For example, the computing device 102 may use received 516 test data to perform calculations or computations. For instance, the computing device 102 may use voltage measurements to compute gain or attenuation, signal samples to determine a phase difference or processing delay and/or failure messages to determine a failure rate, etc. The post-processing may be performed 518 in accordance with the plurality of test objects 226. For example, the test objects 226 may include one or more functions to post-process (e.g., calculate, compute, etc.) received 516 test data to determine or obtain desired information.

The computing device 102 may perform 520 datalogging functions. For example, the computing device 102 may store received 516 test data and/or post-processed data or information. For instance, the computing device 102 may organize and store test results and/or data.

In one configuration, each measurement or test produces a result aimed to determine whether the DUT 108 is functional or not. This result may come either in a binary form (e.g., pass or fail), or a parametric value that is compared against a lower and upper limit. An ATE 106 may provide a way to record all the results of a program execution into an external file. This is commonly called "datalogging." Datalogging may, for instance, allow product engineers to analyze device performance and detect deviations on the silicon or assembly processes. Since datalogging may be performed by a typical set of instructions within the program code, the computing device 102 (e.g., framework) may provide a pure virtual definition to encapsulate this task, thus forcing all derived classes 218 to define it. The computing device 102 (e.g., the framework) may also take care of calling this datalogging function in the proper sequence and standardize the format in which the data is stored in the datalog.

The computing device 102 may dispose 522 of the plurality of test objects. For example, the computing device 102 may call destructor functions for the plurality of test objects 226. This may help to free computing device 102 resources that were used for testing. Additionally or alternatively, the computing device 102 may send a message (e.g., command, function call, information, etc.) to the ATE 106 that causes the ATE 106 to disconnect its instruments from the DUT 108, for example.

Figure 6:
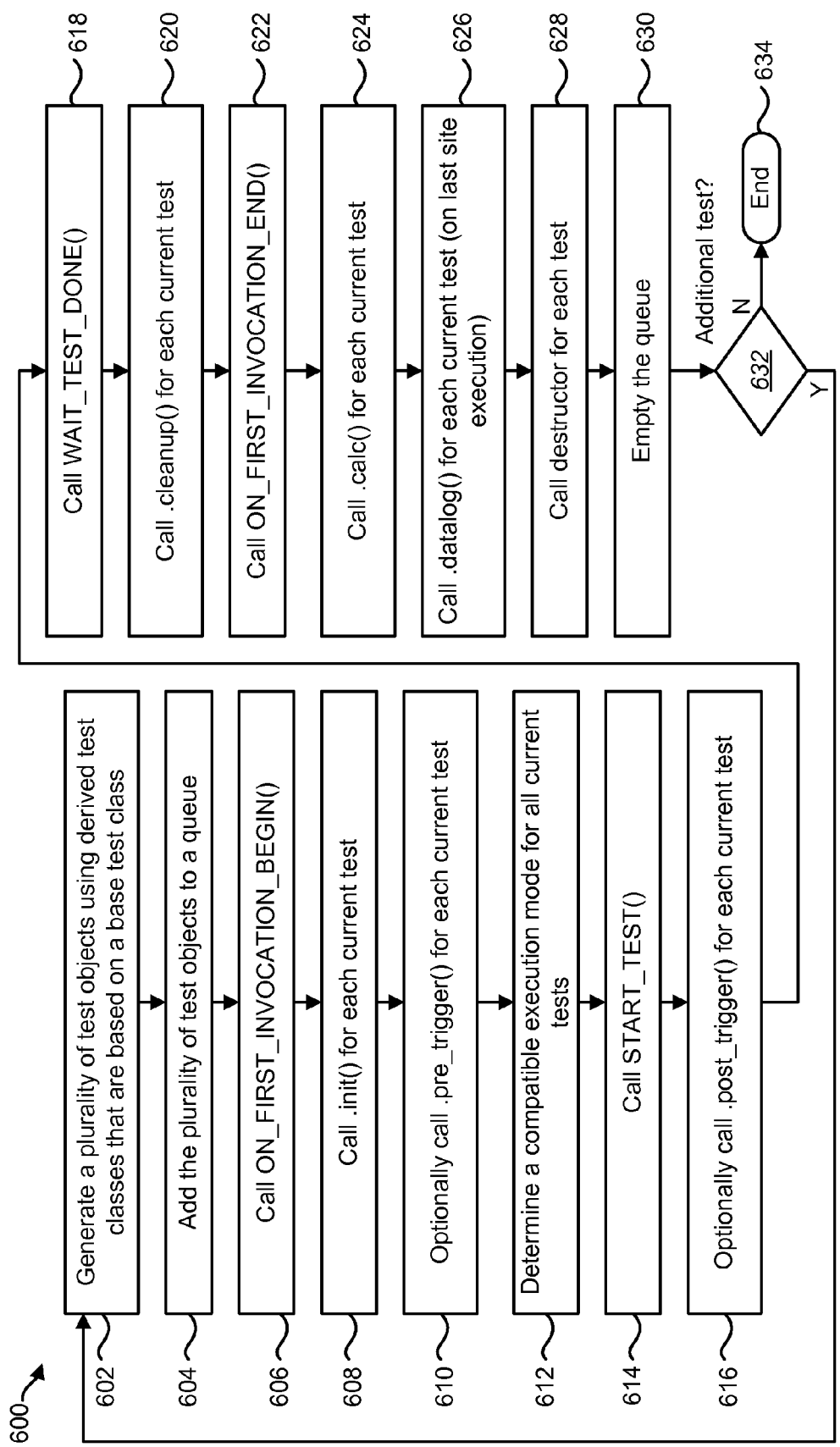
FIG. 6 is a flow diagram illustrating one example of a more specific configuration of a method for enabling concurrent testing.

FIG. 6 is a flow diagram illustrating one example of a more specific configuration of a method 600 for enabling concurrent testing. A computing device 102 may generate 602 a plurality of test objects 226 using derived test classes 218 that are based on a base test class 212. For example, the computing device 102 may instantiate multiple derived test classes 218. When the test objects 226 are generated 602, parameters used by the concurrent testing module 204 may be initialized. As described above, each of the plurality of test objects 226 may correspond to separate blocks 110 in a DUT 108.

The computing device 102 may add 604 the plurality of test objects 226 to a queue (object) 224. For example, the computing device 102 may generate and/or include a queue object 224 that may hold or include one or more test objects 226. As the plurality of test objects 226 are generated 602, they may be added 604 to this queue object 224.

The computing device 102 may call 606 an ON_FIRST_INVOCATION_BEGIN( ) function. It should be noted that the term "call" as used herein may include sending a message to another device. For example, a computing device 102 may "call" a function by sending a message to the ATE 106. Calling 606 the ON_FIRST_INVOCATION_BEGIN( ) function may begin a procedure for executing concurrent tests. In calling 606 the ON_FIRST_INVOCATION_BEGIN( ) function, the computing device 102 may call other functions. For example, the computing device may call 608 an .init( ) function for each current test. The "current" tests are tests that are to be executed concurrently and/or in a group. In one configuration, the queue object 224 may contain groups of tests that are to be executed concurrently on separate blocks 110. The .init( ) function may initialize parameters used by the concurrent test module 104. It may also cause the ATE 106 to prepare its instruments for testing. This .init( ) function may be called and/or executed for each current test object 226.

The computing device 102 may optionally call 610 a .pre_trigger( ) function for each current test. The .pre_trigger( ) function may be used for certain different tests or test modes not initially considered in the framework. Thus, the .pre_trigger( ) function may be called 610 when it is used and may not be called when it is not used.

The computing device 102 may determine 612 a compatible execution mode for the plurality of test objects 226. For example, different test objects 226 (for different tests and/or blocks 110, for example) may use particular execution modes. In order for concurrent testing to function properly, the computing device 102 may determine 612 an execution mode that is compatible with each of the tests to be concurrently executed.

The computing device 102 may call 614 a START_TEST( ) function. The START_TEST( ) function may cause the ATE 106 to begin testing. For example, the computing device 102 may call 614 the START_TEST( ) by sending a message to the ATE 106 to begin concurrently testing the DUT 108 blocks 110.

The computing device 102 may optionally call 616 a .post_trigger( ) function for each current test. The .post_trigger( ) function may be used for certain different tests or test modes not initially considered in the framework. Thus, the .post_trigger( ) function may be called 616 when it is used and may not be called when it is not used.

The computing device 102 may call 618 a WAIT_TEST_DONE( ) function. The WAIT_TEST_DONE( ) function may monitor the testing status of the ATE 106. For example, the WAIT_TEST_DONE( ) function may suspend further code execution until the computing device 102 determines that the ATE 106 has completed its current tests. For example, the WAIT_TEST_DONE( ) function may periodically request status updates from the ATE 106 and/or wait to receive a message from the ATE 106 to determine that the current tests are complete before proceeding.

The computing device 102 may call 620 a .cleanup( ) function for each current test. The .cleanup( ) function may disable triggers and/or restore the original state of the ATE 106 instruments. The computing device 102 may call 620 the .cleanup( ) function by sending a message to the ATE 106 to restore the original instrument state(s).

The computing device 102 may call 622 an ON_FIRST_INVOCATION_END( ) function. Calling 622 the ON_FIRST_INVOCATION_END( ) function may cause other functions to be called or executed. For example, the ON_FIRST_INVOCATION_END( ) function may include a .calc( ) function, a .datalog( ) function and/or a destructor function.

The computing device 102 may call 624 a .calc( ) function for each current test. The .calc( ) function may perform post-processing and generate test results. For example, the .calc( ) function may use test measurements or data to calculate or compute test results. It should be noted that in some configurations, the test measurements or data without post-processing may be test results.

The computing device 102 may call 626 a .datalog( ) function. The .datalog( ) function may perform datalogging functions. The .datalog( ) function may be called upon the last site execution. For example, the computing device 102 may store received test data and/or post-processed data or information. For instance, the computing device 102 may organize and store (e.g., "datalog") test results and/or data.

It should be noted that a single program execution may be testing more than one device in parallel. This may require an ATE-DUT interface board where more than one device can be inserted at a time. These applications are typically called "Multi-Site." The term "site" in this context may refer to a specific DUT 108 or block 110 within this collection of multiple parallel DUTs 108 or blocks 110 in the application and to all of the ATE instruments associated to test this specific DUT 108. For instance, an application may then have an ATE instrument channel dedicated to test the DUT 108 at "Site #1", while a different channel is used to test the DUT 108 at "Site #2", allowing parallel execution of a test across inserted devices.

In one configuration, the Verigy 93K programming allows targeting of specific commands on a per-site basis. In this way, a programmer may independently control the ATE 106 resources used on each site.

In multi-site applications, each TestMethod call in a TestSuite may be effectively executed as many times as sites are configured for the application (for example, on a quad-site application, the BlockA_Test1_TM(PA1) TestMethod call will be sequentially executed four times). Usually, the actual test execution for all sites may happen in parallel during the first TestMethod call, while in the subsequent calls the program may only fetch the results, post-process them and datalog. The Verigy 93K provides an API macro called ON_FIRST_INVOCATION( ) Code surrounded by this macro may only be executed on the first TestMethod call, while everything else may be executed in the calls for each of the sites (e.g., four times in the quad-site example cited before).

The ON_FIRST_INVOCATION may encapsulate all the instrument configuration and setup, the execution API command (START_TEST( ) EXECUTE_TEST( ) etc.) and cleanup functions, which may be called just once and perform their functions in parallel for all active sites. The "last site execution" expression may refer to the last sequential call to a given TestSuite's associated TestMethod (e.g., the fourth execution of the TestMethod on a quad-site multi-site application).

The computing device 102 may call 628 a destructor for each test. For example, a destructor function for each test object 226 may be called 628 in order to dispose of the test objects 226 and free computing device 102 resources. The computing device 102 may empty 630 the queue 224. For example, as the test objects 226 are disposed of (e.g., the destructor is called 628), they 226 may be removed from the queue 224.

The computing device 102 may determine 632 if there is an additional test to be performed. For example, the computing device 102 may determine 632 whether there is an additional test, group of concurrent tests, series of tests and/or series of concurrent tests to be performed. For instance, a computing device 102 may determine 632 whether there are any remaining tests scheduled (e.g., in a "TestFlow"). If the computing device 102 determines 632 that there is an additional test, the computing device 102 may return to generate 602 one or more test objects for the next test(s). If the computing device 102 determines 632 that there is not an additional test, operation may end 634.

Figure 7:
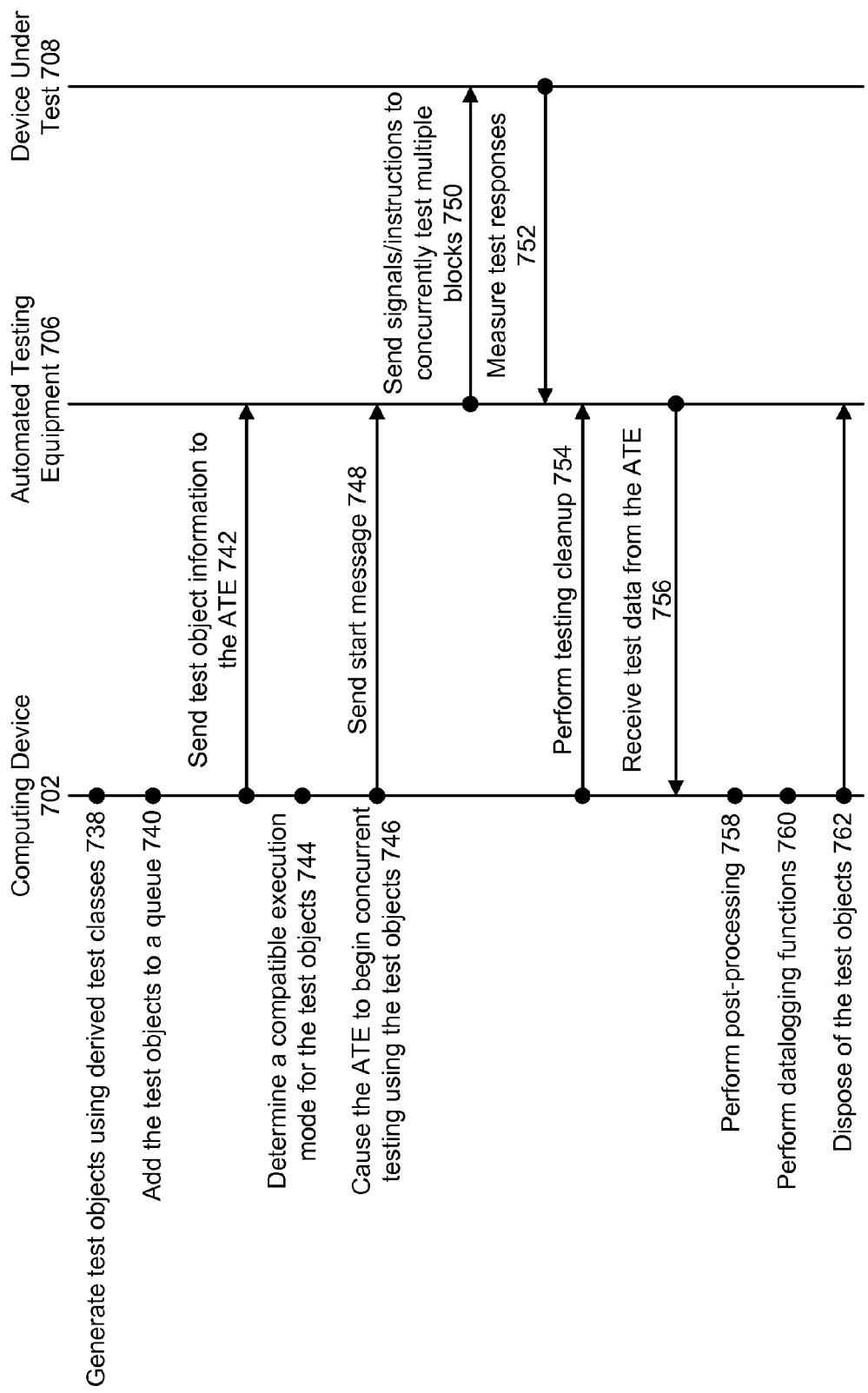
FIG. 7 is a thread diagram illustrating one configuration of some operations that may be performed in accordance with the systems and methods disclosed herein.

FIG. 7 is a thread diagram illustrating one configuration of some operations that may be performed in accordance with the systems and methods disclosed herein. A computing device 702 may generate 738 a plurality of test objects 226 using derived test classes 218 that are based on a base test class 212. For example, the computing device 702 may instantiate multiple derived test classes 218. When the test objects 226 are generated 738, parameters used by the concurrent testing module 204 may be initialized. As described above, each of the plurality of test objects 226 may correspond to separate blocks 110 in a DUT 708.

The computing device 702 may add 740 the plurality of test objects 226 to a queue (object) 224. For example, the computing device 702 may generate and/or include a queue object 224 that may hold or include one or more test objects 226. As the plurality of test objects 226 are generated 738, they may be added 740 to this queue object 224.

The computing device 702 may send 742 test object information (or information based on the plurality of test objects 226) to an ATE 706. For example, the computing device 702 may send 742 one or more test message(s) 228 based on the test objects 226. For instance, the computing device 702 may send 742 one or more function calls, instructions, variable values, data and/or other information to the ATE 706 based on the test objects 226. In one configuration, the computing device 702 may send 742 the test objects 226 to the ATE 706. The test message(s) 228 and/or test objects 226 may be formatted for transmission. It should be noted that sending 742 information based on the test objects 226 to the ATE 706 may be performed independently and/or as part of some of the following operations illustrated in FIG. 7.

For example, the computing device 702 may initialize test variables and/or ATE instruments by sending 742 test object information to the ATE. For instance, the computing device 702 may set variable values in order to perform the tests. The computing device 702 may additionally or alternatively initialize one or more ATE instruments for performing a test. For example, the computing device 702 may send 742 information to the ATE 706 that causes the ATE 706 to prepare one or more of its 706 instruments for testing. This information may include function calls, variable values and/or other data.

The computing device 702 may determine 744 a compatible execution mode for the plurality of test objects 226. For example, different test objects 226 (for different tests and/or blocks 110, for example) may use particular execution modes. In order for concurrent testing to function properly, the computing device 702 may determine 744 an execution mode that is compatible with each of the tests to be concurrently executed.

The computing device 702 may cause 746 the ATE 706 to begin concurrently testing the separate blocks 110 in the DUT 708 using the plurality of test objects 226. For example, the computing device 702 may send 748 a start message (e.g., one or more commands and/or function calls) to the ATE 706 in order to begin concurrent testing of the DUT 708 blocks 110. This may cause the ATE 706 to concurrently test separate blocks 110 based on the test objects 226. For instance, the ATE 706 may receive the start message that causes it to concurrently test multiple blocks 110 by sending 750 signals and/or instructions to the DUT 708 to concurrently test multiple blocks 110. The ATE 706 may measure 752 test responses from the DUT 708. For example, the ATE 706 may measure, probe and/or receive test results or data from the DUT 708. These concurrent tests may be done in accordance with the test objects 226. For example, the ATE 706 may test those blocks 110 corresponding to the test objects 226 according to instructions that are based on the test objects 226.

The computing device 702 may perform 754 testing cleanup. In one configuration, the computing device 702 may perform 754 testing cleanup by disabling triggers and restoring the original state of the ATE instruments. For example, the computing device 702 may send a message, a command, a function call, instructions, data and/or other information that causes the ATE 706 to restore its instruments back to their original state before testing.

The computing device 702 may receive 756 test data from the ATE 706. For example, the computing device 702 may receive 756 test measurements, data, messages and/or other information from the ATE 706 regarding the tests performed. For instance, the ATE 706 may send signal measurements (e.g., amplitude, phase, frequency, voltage, current, delay, samples, etc.), block outputs, messages (e.g., digital messages, outputs, failures, etc.) and/or other measurements or test results. These may be received 756 by the computing device 702. In one configuration, the computing device 702 may receive 756 the test data in a "hidden" fashion (e.g., as a background process). More detail is given below.

The computing device 702 may perform 758 post-processing. For example, the computing device 702 may use received 756 test data to perform calculations or computations. For instance, the computing device 702 may use voltage measurements to compute gain or attenuation, signal samples to determine a phase difference or processing delay and/or failure messages to determine a failure rate, etc. The post-processing may be performed 758 in accordance with the plurality of test objects 226. For example, the test objects 226 may include one or more functions to post-process (e.g., calculate, compute, etc.) received 756 test data to determine or obtain desired information.

The computing device 702 may perform 760 datalogging functions. For example, the computing device 702 may store received 756 test data and/or post-processed data or information. For instance, the computing device 702 may organize and store test results and/or data.

The computing device 702 may dispose 762 of the plurality of test objects. For example, the computing device 702 may call destructor functions for the plurality of test objects 226. This may help to free computing device 702 resources that were used for testing. Additionally or alternatively, the computing device 702 may send a message (e.g., command, function call, information, etc.) to the ATE 706 that causes the ATE 706 to disconnect its instruments from the DUT 708, for example.

Figure 8:
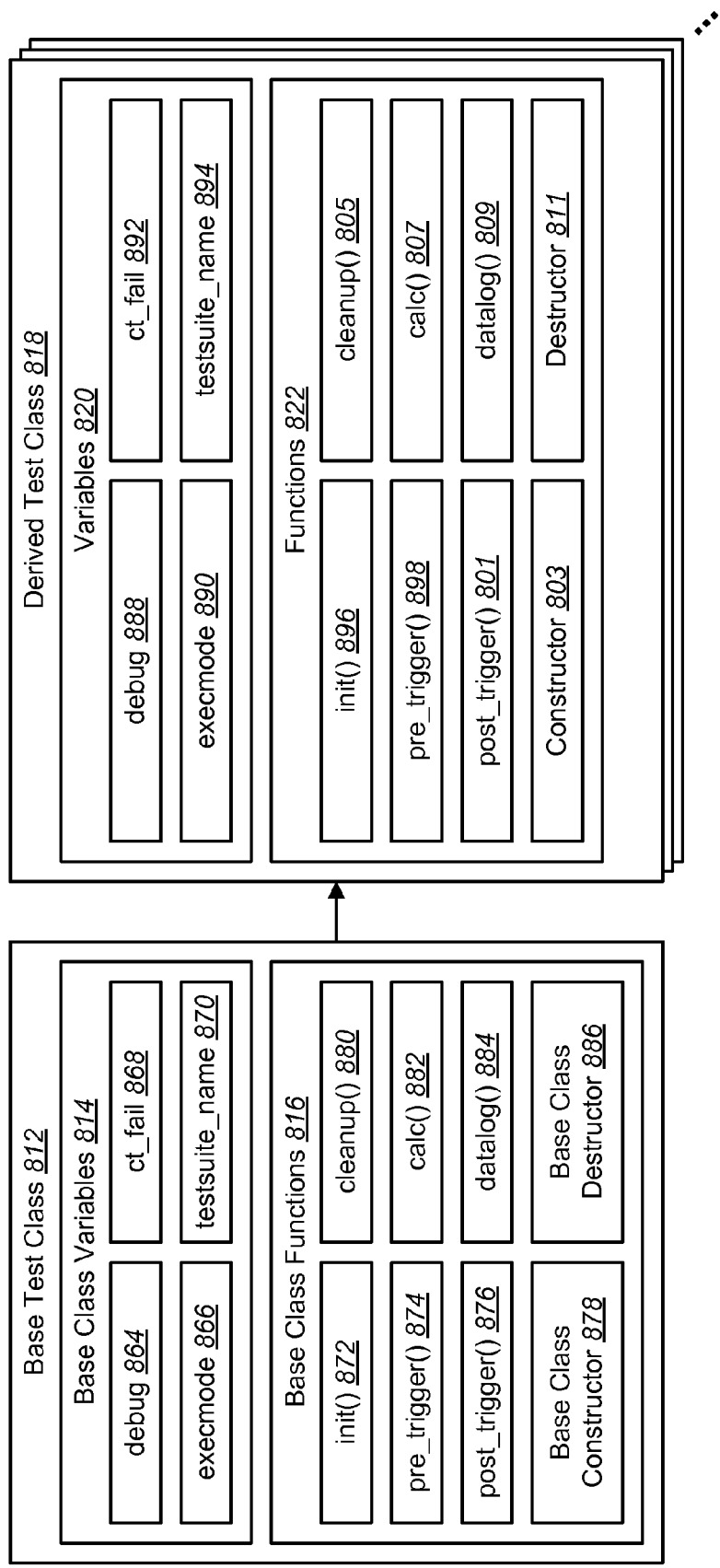
FIG. 8 is a block diagram illustrating one example of a base test class and derived test classes.

FIG. 8 is a block diagram illustrating one example of a base test class 812 and derived test classes 818. The base test class 812 may include base class variables 814 and base class functions 816. In this example, the base class variables 814 include debug 864, ct_fail 868, execmode 866 and testsuite_name 870. More detail on these base class variables 814 is given hereafter. In this example, the base class functions 816 include init( ) 872, pre_trigger( ) 874, post_trigger( ) 876, a base class constructor 878, cleanup( ) 880, calc( ) 882, datalog( ) 884 and a base class destructor 886. More detail on these base class functions 816 are given hereafter.

One or more derived test classes 818 may inherit one or more base class variables 814 and/or base class functions 816 or be based on the base test class 812. A derived test class 818 may include variables 820 and functions 822. In this example, the variables 820 include debug 888, ct_fail 892, execmode 890 and testsuite_name 894, which may be inherited from the base test class 812. More detail on the variables 820 is given hereafter. The derived test class 818 may include other variables 820 that are not inherited from the base test class 812.

The functions 822 may include init( ) 896, pre_trigger( ) 898, post_trigger( ) 801, a constructor 803 (for the derived test class 818), cleanup( ) 805, calc( ) 807, datalog( ) 809 and a destructor 811 (for the derived test class 818). Some of these functions 822 (e.g., init( ) 896, pre_trigger( ) 898, post_trigger( ) 801, cleanup( ) 805, calc( ) 807 and datalog( ) 809) may be inherited from the base test class 812 and/or defined or implemented in the derived test class 818. The constructor 803 and destructor 811 may not be inherited from the base test class 812. More detail on the functions 822 are given hereafter. The derived test class 818 may include other functions 822.

A "TestMethod" may be a function or method (or group of functions/methods) that may be used to test a block 110 on a DUT 108. In one configuration, a TestMethod may be implemented using a derived test class 818. A "TestFlow" may be an interface (e.g., Graphical User Interface or GUI) that displays and/or allows the arrangement of one or more tests. A "TestSuite" may be linked to a TestMethod and may be represented as a rectangle on the TestFlow.

The systems and methods disclosed herein may allow for test time reduction and the execution of tests in parallel (where a device test mode and ATE instruments allow, for example). One configuration, for example, describes a TestMethod programming model to facilitate the transition between standalone testing (in development, for example) and concurrent testing (in production, for example). When the systems and methods disclosed herein are not used, an integration engineer may need to manually merge setups for concurrent tests (e.g., timing, levels, analog sets).

In one configuration, a concurrent TestFlow may make use of combined blocks, deferred execution and/or multi-binning Multi-bin icons may be used for all TestMethod-based TestSuites. The bin assignment may be specified in a TMLimits file. SmarTest may require all bins to be defined in the TestFlow file. Hardware (HW) and software (SW) number binning between TMLimits and TestFlow may need to be matched.

According to the systems and methods herein, a C++ class approach may be used. A conventional TestMethod may be broken down into separate sections based on the common operations that every TestMethod performs. An abstract base class 812 may be created (e.g., "CTest") with pure virtual declarations of the functions 816 that every test should perform. All target TestMethods may be converted into derived classes 818, thus splitting the code across the different functions 822 inherited from the base class (e.g., "CTest") 812. A TestFlow may be used as an interface to instantiate and initialize the objects for the different derived test classes. A particular class object (e.g., "CTests") or queue may be used to collect all the different test objects that need to be executed concurrently. Each of the tests may then be sequentially executed.

One example of an abstract base class (e.g., "CTest") is illustrated in Listing 4. It should be noted that the CTest class illustrated may be similar to the ConcTest class described above.

Listing 4

```
class CTest
{
  public:
    int debug;
```

-continued

Listing 4

```
    static int ct_fail[ALLOC_SITES];
    enum execMode execmode;
    string testsuite_name;
    virtual void init( ) = 0;
    virtual void pre_trigger( ) { };
    virtual void post_trigger( ) { };
    virtual void cleanup( ) = 0;
    virtual void calc( ) = 0;
    virtual void datalog( ) = 0;
      CTest( ){
        GET_TESTFLOW_FLAG("debug_analog", &debug);
        GET_TESTSUITE_NAME(testsuite_name);
        execmode = EXM_INVALID;
      };
      virtual ~CTest( ){ };
    protected:
      int logdata(...);
  };
```

One example of the execMode 866, 890 enumeration or enumerated type follows in Listing 5.

Listing 5

```
enum execMode {
    EXM_INVALID = -1;
    EXM_NONE = 0;
    EXM_EXECUTE_TEST = 1;
    EXM_DIGITAL_CAPTURE_TEST = 3;
    EXM_START_TEST = 5;
    EXM_NB_DIGITAL_CAPTURE_TEST = 7;
  };
```

A brief explanation of the examples illustrated in Listing 4 and Listing 5 is now given. The CTest (base) class 812 includes several member variables 814. Several of these variables 814 are available to derived test classes 818. debug 864, 888 is a variable that is automatically initialized to 0 or 1 depending upon a debug_analog TestFlow flag.

testsuite_name 870, 894 may be automatically initialized to the TestSuite name where the test object was created. execmode 866, 890 may be automatically initialized to EXM_INVALID. The test class 818 may change its value according to the desired execution mode. Some options may include: EXM_NONE, EXM_DIGITAL_CAPTURE_TEST, EXM_NB_DIGITAL_CAPTURE_TEST, EXM_START_TEST and EXM_EXECUTE_TEST.

ct_fail[ ] 868, 892 may be a shared static array that should be set to 1 according to the site number that fails a test. This may be automatically managed by a logdata( ) function if called inside the concurrency framework.

The CTest (base) class 812 may also include member functions 816. Some of these functions 816 may be defined by test classes 818. The base class constructor 878 may initialize parameters used by the concurrency framework (such as execmode 866). This may be called after an ON_FIRST_INVOCATION function. init( ) 872, 896 may initialize test variables and set ATE instruments ready to perform the test. This may also be called after an ON_FIRST_INVOCATION function. pre_trigger( ) 874, 898 may or may not be defined. It is left as a place holder for special test modes not considered in the framework. This may also be called after an ON_FIRST_INVOCATION function. post_trigger( ) 876, 801 may or may not be defined. It is also left as a place holder for special test modes not considered in the framework. This may also be called after an ON_FIRST_INVOCATION function. cleanup( ) 880, 805 disables triggers and restores the original state of the ATE instruments. This may also be called after an ON_FIRST_INVOCATION function. calc( ) 882, 807 performs post-processing and generates test results. These functions may be executed in separate threads. datalog( ) 884, 809 performs datalogging functions. The destructor (e.g., ~CTest( )) 886 cleans up global variables or other program structures created during the test. It may be a safe place to have instrument disconnects. This may be performed after an ON_FIRST_INVOCATION_END function or macro (e.g., in relation to an "ON_LAST_INVOCATION").

It should be noted that the ON_FIRST_INVOCATION section may be recognized in code as the instructions surrounded between ON_FIRST_INVOCATION_BEGIN( ) and ON_FIRST_INVOCATION_END( ) macros. There may not be an equivalent ON_LAST_INVOCATION macro. Rather, this functionality may be artificially emulated in code by using a static variable to count the number of times a given TestMethod has been called and comparing against the number of the sites configured for the application.

In one configuration, the CTest 812 member function execution sequence may proceed as illustrated in Listing 6.

Listing 6

```
ON_FIRST_INVOCATION_BEGIN
  *class.Constructor
  *class.init( )
  *class.pre_trigger( )
START_TEST( )
  *class.post_trigger( )
WAIT_TEST_DONE( )
  *class.cleanup( )
ON_FIRST_INVOCATION_END
  *class.calc( )
  *class.datalog( )
  *class.Destructor( )
```

It should be noted that the pre_trigger( ) 874, 898 and/or post_trigger( ) 876, 801 functions may or may not be defined and may only be executed if they are defined. A START_TEST( ) function or equivalent may be executed in the position of START_TEST( ) which may begin testing. The destructor function 886 may only be executed after the last site.

According to the systems and methods herein, test parameters and/or results may be defined as class variables such that they are available to all class functions. Variables used for intermediate computations may not be declared as class members. All pure virtual functions of the CTest class 812 may be declared (and later defined) in the derived class 818. The CTest pre_trigger( ) 874 and post_trigger( ) 876 virtual functions may not be declared, which may not cause compilation issues. Additional member functions 816 may be declared.

In one configuration, it should be noted that before using an analog instrument in a test in the Verigy 93K, an analog definition (or analog set) should be created. Definitions may basically contain the name of the instrument(s) to be used in the test, the parameters to configure it (e.g., termination type, voltage/power range, frequency, etc.), and a sequencer program with instructions specifying the number of measurements or sourcing time.

A definition may be either created using a Graphical User Interface (GUI) before program execution, or using plain C++ code inside the program code. In any case, the definition may need to be completed before attempting to use the instrument in an actual test. For example, RF_DEF( ) refers specifically to an analog definition involving the ATE 106 Radio Frequency (RF) instruments. DATA_DEF( ) are sub-elements that can be used in an RF_DEF( ) to give values to certain parameters. DATA_DEFs, for example, might include variables used to define a parameter inside an RF_DEF( ) That allows dynamically changing parameters on an RF_DEF( ) by just modifying the value of a DATA_DEF( ) associated with it.

DGT.trigger( ) and AWG.trigger( ) may be commands used inside program code to trigger an instrument. For example, this is what is called software (SW) triggering, since it is performed and sequenced through program code (e.g., as opposed to a hardware (HW) trigger, which is controlled through a digital signal, most of the times driven by a digital pattern synchronized with the DUT 108). EXECUTE_GROUP( ) may be a special kind of software (SW) trigger, which will perform an instrument triggering sequence predefined by the user in terms of seconds between triggers.

Primaries (e.g., timing, levels and analog sets) may not be changed inside a concurrent test class. The TestSuite window in the TestFlow may control it. This allows the later modification of the primaries in the TestFlow to point to their (manually) merged versions. Using explicit definition names that may change in a merged analog set may be avoided. Variables and DATA_DEF may be used instead of changing parameters explicitly for a given RF_DEF. Software triggering may not be concurrent-execution friendly (e.g., DGT.trigger( ) AWG.trigger( ) and EXECUTE_GROUP( ) may not be used). Instead, hardware triggering may be used.

The logdata( ) function may be used for testing against limits and datalogging. It should be noted that datalog( ) may be a pure virtual function declared in a parent class (e.g., concurrency class), which all derived test classes may define to include their datalogging commands. logdata( ) on the other hand, may be a support function defined within the library (e.g., concurrency library), which can be called within the datalog( ) function defined in each test class to throw results into the datalog in a standardized format.

Variables that are used only for intermediate calculation purposes may be brought into local scope. Test parameters and results may be defined as class members. Tests requiring more than one START_TEST( ) may be reengineered into sequencer programs using hardware (HW) triggering.

When converting TestMethod code from a code used in a typical approach, TestMethod header structures may not need to change to be formatted for use in the class-based approach. A TestMethod interface may instantiate an object of the proper class inside the ON_FIRST_INVOCATION( ) function. It may initialize parameters (e.g., class members), add the object 226 to the CTests queue 224 and use TestFlow variables to control concurrent execution.

The CTests queue 224 may continue to grow until its exec( ) function is called. Then it may call all of the member functions of its accumulated test objects. The CTests.exec( ) function may run via the TestMethod interface provided with a library. While the C++ code may be executed serially, the instruments may be run in parallel, thereby saving test time. The class-based approach facilitates a future parallel code execution in threads (by assigning each test object to a thread, for example).

Further explanation regarding the logdata( ) function 884, 809 is now given. When implementing concurrent testing, more than one functional block on the device is tested at a time. Multi-binning may be used in order to differentiate failing behavior. Multi-binning allows the specification of failing hardware (HW) and/or software (SW) bin number(s) in code when a TestSuite fails. TMLimits provides an interface to maintain both bin numbers per test and test limits. The logdata( ) function 884, 809 may handle multi-binning and TMLimits behind the scenes. A single function for testing and datalogging may standardize all tests outputs and facilitates any required change of implementation.

The logdata( ) function 884, 809 may be defined inside a concurrency library. However, it may be used even in non-concurrent (and/or non-class-based) TestMethods. When the TestSuite name is not specified, the TestSuite name where the test class object was instantiated may be used and concatenated to a "testname". An OVERON flag may be set to 1 by default. TestMethod execution may not be broken, such that all concurrent tests can finish execution and the Ctests queue 224 is emptied.

It should be noted that within the TestFlow interface, a TestSuite might have a fail bin element associated to it. This bin is a "tag" that may be associated to the DUT 108 if it fails for the test performed in said TestSuite. When program execution runs into a fail bin, the device may be assumed to be defective and program execution is terminated for that DUT 108 to proceed with testing other devices. The OVERON flag on a failing bin may allow program execution to continue even when a device runs into a bin. This may be especially useful for characterization (when a device might fail a given test), but it is still of interest to keep running the program after this failure to evaluate performance on other parameters.

This following section gives further explanation on one configuration of the systems and methods described herein. Again, while reference is made to certain platforms (e.g., Verigy) and/or programming languages (e.g., C++), the systems and methods disclosed herein may be applied to many different platforms and may use many different programming languages.

This section describes the use of the generic concurrency TestMethod structure to organize code in such a way that later concurrent test implementation is eased. This section deals with TestMethod code structure and integration. Analog instruments setup integration is a topic that is covered in greater detail below.

The Verigy ATE platform allows the user to use C++ language to code custom defined tests. One of the most powerful features this language offers is Object Orientated Programming (OOP), which allows a programmer to define independent blocks of self-contained code that are relevant to a specific task. This favors the parallel development of small pieces of code for a larger project and code reusability.

Objects can be defined via special structures called classes, which may contain custom variables and user-defined functions that operate using these variables. A well structured class may contain all the variables and functions pertinent to a given task. A programmer may then define the scope of each of these variables and functions to define whether external code or other objects can access them directly.

Other concepts that generic programming may rely on are inheritance and polymorphism. These allow the programmer to define a base class with its own variables and functions that can later be used as a template to define a derived class that will inherit those same attributes and may declare some additional ones. The inherited functions can also be overwritten and redefined, allowing a derived class to have a function with the same name but that executes in a different way according to the class-specific needs and purposes.

A structure and set of guidelines have been created to ease the integration of different pieces of code into a merged concurrent TestMethod. This structure relies on the concepts briefly mentioned above. Adherence to these guidelines helps to greatly reduce the amount of work required to migrate from a regular serial test execution program to a merged concurrent program. This section describes some guidelines and points out some important concepts that may be used in particular implementations. This pertains to TestMethod programming structures; merging of the analog instrumentation setups may be dealt with separately.

To allow the creation of a generic TestMethod that can handle the call of any kind of test for any block, a generic template base class CTest (e.g., "Concurrent Test") 812 was created that would define the most common tasks and variables 814 that every single test should perform. Each test would be a class 818 derived from this CTest base class 812 that would inherit some basic function and variable structures. Since their names are common to all derived classes 818, these can be called generically from the concurrency TestMethod regardless of the specific kind of test that is being performed.

This approach may be further extended as necessary. An implementation might introduce an intermediate class that encapsulates a set of tests that are common to a given block. Taking a BBRx (e.g., "Baseband Receive") function as an example: a given implementation could define two completely independent tests, SNR (Signal-to-Noise Ratio) and IRN (Input Referred Noise), which are based on the parent BBRx class. This allows the definition of global functions that might be common to all the tests (e.g., unpack_data) in the BBRx parent class. Those functions may be inherited by the derived test classes. This may occur similarly for global variables.

Each test may be divided into tasks or common functions as follows. myTest::myTest( ) this is a constructor function 803. It is executed only once when the object is first created. This function may be used to parse the test parameters and initialize constants and variables. One or more common variables may also be initialized in this piece of code so their correct values are available through the rest of the program execution. For example, common variables may be parent class member variables that are inherited to all the derived test classes 218. This may be similar to the common functions, which refers to the member functions.

myTest::init( ) 896: this function may be used to set up any instrument that is going to be used during the test. It can also be used to query or set the measure/source instrument for its properties (e.g., number of points, frequency, power level, etc.). After this function is executed, the concurrency TestMethod expects instruments to be ready to receive a trigger and start a source/measure operation. This function is executed once inside the ON_FIRST_INVOCATION block before the test is performed, but all the test class members will preserve their values through the execution of the different sites.

myTest::pre_trigger( ) 898: this function may be used as a place holder for special test implementations. It is given to provide a way to execute triggering in a way not contemplated by the concurrency TestMethod. This function does not need to be explicitly declared in the test class 818 if it is not going to be used. This function is executed once inside the ON_FIRST_INVOCATION block, and is performed before the digital sequencer is set to "RUN" mode. myTest::post_trigger( ) 801: this function may be used as a place holder for special test implementations. It is given to provide a way to execute a triggering in a way not contemplated by the concurrency TestMethod. This function does not need to be explicitly declared in the test class 818 if it is not going to be used. This function is executed once inside the ON_FIRST_INVOCATION block and is performed after the digital sequencer is set to "RUN" mode.

myTest::cleanup( ) 805: this function may be used to disable a trigger or reset any instrumentation used during the test. For example, it may also be used to restore any other hardware state that may have changed via firmware (FW) commands for the execution of the test (except disconnect, for example). For instance, the Verigy 93K offers an API to the programmers that gives direct access to most of the low level commands (e.g., firmware commands) used to program the ATE 106 and attached instrument cards. Thus, cleanup( ) function may be used to restore any low level change that was performed in the ATE instruments using firmware commands. Disconnecting may happen in the destructor 811. This function is executed once inside the ON_FIRST_INVOCATION block after the test has been executed.

myTest::calc( ) 807: this function may be used to retrieve test results from the instruments and run post-processing computations. This function is called outside the ON_FIRST_INVOCATION block and thus is executed in a per-site basis. Still, test class member variables will preserve their values across site execution, thus special care should be used to reinitialize result variables that under certain conditions may not be explicitly recalculated. Each of the calc( ) functions 807 for the concurrent test classes in the same TestSuite may be run in separate threads where applicable (to further improve parallelism).

myTest::datalog( ) 809: test statements may be called within this function or their equivalent TMLimits calls to test and datalog results. This function is called outside the ON_FIRST_INVOCATION block and thus is executed in a per-site basis.

In one configuration, TMLimits is a separate API library that Verigy once distributed separately, but which is now merged in the latest SmarTest revision and has be renamed to 93 KLimits. This API library manages the test limits used by parametric tests in the program. In and older conventional SmarTest program, limits were a data element stored inside the TestSuite object in a TestFlow file. However, it may be more convenient to have all the limit information concentrated and stored on a separate file that is linked to the program via the TestSuite names. The TMLimits library may be a set of functions that loads this external file into a table in memory and provides access to these limits using the TestSuite name and test parameter name as look-up keys. This may be a requirement for concurrency, since (as the model describes) the actual testing and datalogging may happen on a different TestSuite depending on the concurrent arrangements. Thus, the computing device 102 (e.g., framework) requires this dynamic access to limits information outside the individual TestSuite scope limitation that the conventional approach had.

TMLimits additionally allows to define the fail bin number to use if a given test fail, also moving away from the conventional bin associated to a specific test-suite.

myTest::~myTest( ) This the destructor function 811. It is executed only once when the object 226 is destroyed. The concurrency TestMethod will force the destructor call at the end of the TestMethod execution for the last active site. The function may be used to deallocate memory for special dynamic variables that may have been created during the test execution, close any open file stream or to clean up any other programming-related artifact created by the executed code, for example. This function may include the disconnect routine for analog instruments.

Each test may initialize inherited class member variables as follows. myTest::execmode 890: this is a pre-defined enum type that is used to indicate the type of test to be executed and thus the required test command (e.g., START_TEST, DIGI- TAL_CAPTURE, etc.) that needs to be issued. This variable can take the following predefined values: EXM_NONE, EXM_EXECUTE_TEST (blocking), EXM_START_TEST (non-blocking), EXM_DIGITAL_CAPTURE_TEST (blocking) or EXM_NB_DIGITAL_CAPTURE_TEST (non-blocking) A "blocking" execution statement will stop TestMethod code execution until all the test instruments (e.g., digitizer, Arbitrary Waveform Generator (AWG), digital sequencer, etc.) have finished running, while a "non-blocking" statement will kick-start the instruments and continue code execution. In one configuration, the AWG is a configurable Digital-to-Analog converter (DAC). As discussed here, it may refer to an ATE instrument used to drive analog waveforms into the DUT 108.

Additionally, each test automatically inherits the following base class variables: myTest::debug 864 (e.g., inherited as myTest::debug 888): this variable is automatically populated with 0 or 1 based upon the debug_analog TestFlow flag. It may be used as a flag to print data to the report window or other debugging tasks. MyTest::testsuite_name 870 (e.g., inherited as MyTest::testsuite_name 894): this variable is automatically populated with the TestSuite name. This variable allows the test object to have access to the TestSuite name where it was originally created (which may be different from the TestSuite where the test is executed, for example). ct_fail 892 may also be inherited from the base test class 812.

Many more class variables may be defined for the test as part of its interface (TestMethod parameters). These variables may be filled in by the TestMethod interface after the class is instantiated and prior to running the test.

The following is a brief outline of the sequential order in which each of the common concurrent functions may be called: ON_FIRST_INVOCATION_BEGIN, *class.Constructor, *class.init( ), *class.pre_trigger( )(if defined), START_TEST( )(or an equivalent function), *class.post_trigger( )(if defined), WAIT_TEST_DONE( ) *class.cleanup( ) ON_FIRST_INVOCATION_END, *class.calc( )*class.datalog( ) and *class.Destructor( )(which may be executed only after the last site).

The CTest concurrent execution model is described hereafter. Individual CTest objects 226 are instantiated by TestMethods. The interfaces to these TestMethods may be similar to legacy TestMethods. One difference in the TestSuite interface is the addition of a parameter to optionally execute the TestMethod non-concurrently.

The TestMethod body may be segmented into a CTest class structure and replaced. The body may be a mechanism to translate the TestMethod interface into the CTest interface. The TestMethod instantiates an object 226 of a given CTest class, fills in its parameters and places it on the "CTests" queue for execution. Optionally, it executes the queued object. The "execute" TestSuite and TestMethod allow modification and overriding to run the individual CTest concurrently and then executes the queued CTests.

A function, logdata( ) 809, has also been created inside of the framework to facilitate the proper use of TMLimits while testing and datalogging parameters. It handles some details to properly fetch limits information from the original calling TestSuite rather than the concurrent TestSuite where all the queued tests are executed. It also incorporates multi-binning support that is synchronized with the CTests.exec( ) function. All concurrent tests may be required to include hardware (HW) and software (SW) bin information in a TMLimits file. logdata( ) 809 may be called either within a CTest derived class 818 or from any external module not related to concurrency at all.

Two implementations of this function are available. In one implementation of logdata( ) 884, 809, it concatenates the TestSuite name and a test parameter name into a single string when trying to fetch data from the TMLimits file. This allows tracking of the test parameters when observing datalogs generated using a concurrent program (where the original TestSuite name would be lost otherwise, for example). Another implementation of logdata( ) 884, 809 allows the definition or specification of what TestSuite and test parameter names to use when searching the TMLimits file.

The logdata( ) function 884, 809 may be used within a CTest-derived class for concurrency as follows. For example, these following function call headers may be used within a CTest-derived class: int CTest::logdata(std::string testName, double value, std::string pinName=" "); int CTest::logdata (std::string testSuiteName, std::string testName, double value, std::string pinName=" "). pinName may be an optional parameter. It may or may not be included in the function call. Whenever it is not included, this parameter will take the value of an empty string.

In many cases, for example, the function may be used in its simplest call format as follows: logdata("ch0_snr_i", ch0_snr_i_dB). A logical pass/fail result of the test can also be stored in a variable: int passed=logdata("ch0_snr_i", ch0_snr_i_dB). A pin name can be added to the datalog using the optional parameter: int passed=logdata("ch0_snr_i", ch0_snr_i_dB, "ATEST_BUS"). All of these function calls (of the "type-1" implementation, for example) assume that the TMLimits file contains an entry similar to that illustrated in Table 6.

TABLE 6

| Suite Name | Test Name | Lsl | Usl | ... | Bin_h_num | Bin_h_name | Bin_s_num | Bin_s_name |
|---|---|---|---|---|---|---|---|---|
| AnBBRx1xSNR | AnBBRx1xSNR_ch0_snr_i | 65 | 90 | ... | 6 | HWBin6 | 850 | BBRxSNR |
| AnBBRx1xSNR | AnBBRx1xSNR_ch0_snr_q | 65 | 90 | ... | 6 | HWBin6 | 850 | BBRxSNR |
| AnBBRx1xSNR | AnBBRx1xSNR_ch1_snr_i | 65 | 90 | ... | 6 | HWBin6 | 850 | BBRxSNR |
| AnBBRx1xSNR | AnBBRx1xSNR_ch1_snr_q | 65 | 90 | ... | 6 | HWBin6 | 850 | BBRxSNR |

Several remarks should be noted: the debug output from the logdata( ) function 884, 809 may be controlled by an analog_debug flag. When calling the function inside a concurrent class, an overon flag used in the test statement is always set to 1 to allow the proper conclusion of all the concurrently executed tests (the code may continue executing until the end even if a test fails, for example). In a concurrent test execution, the bin for the first failing test will be used to bin the device (other tests queued may still be completed and datalogged). However, if any other test fails, its binning information may be discarded. The multi-bin element may be used in the flow for the TestSuite where concurrent tests are going to be executed. Any hardware (HW) and software (SW) bin number and description used in the TMLimits file may need to exist in the TestFlow as an actual bin for multi-binning to work properly (e.g., the TMLimits file may match existing bins in the flow). A concurrent TestFlow may use actual bins per test setup and include a multi-bin for the concurrent TestSuite.

The logdata( ) function 884, 809 may be used outside of concurrent test classes 818. For example, the logdata( ) function 884, 809 can also be called outside the concurrent framework, where slightly different headers may be used to access this function as follows: int logdata(std::string testName, double value, std::string pinName=" ", int overon=1, int multibin=0); int logdata(std::string testSuiteName, std::string testName, double value, std::string pinName=" ", int overon=1, int multibin=0).

Almost all the points described for the CTest-derived implementation of the logdata( ) function 884, 809 apply here as well, with the following exceptions: the overon flag can now be changed if desired to stop TestMethod code execution at the first failing test, but by default this flag is set to 1 if not specified in the function call. When calling a function outside a concurrent class, multi-binning is not necessarily expected, and by default is disabled. If multi-binning is desired outside of concurrent tests, it might still be enabled by explicitly setting the multibin parameter to 1 in the function call. The Concurrency_lib.h file may be included in the target code. The concurrency library .so file may be linked while building the project (this is true as well for the usage under a CTest-derived class, but may be an assumed prerequisite to use concurrency).

Figure 9:
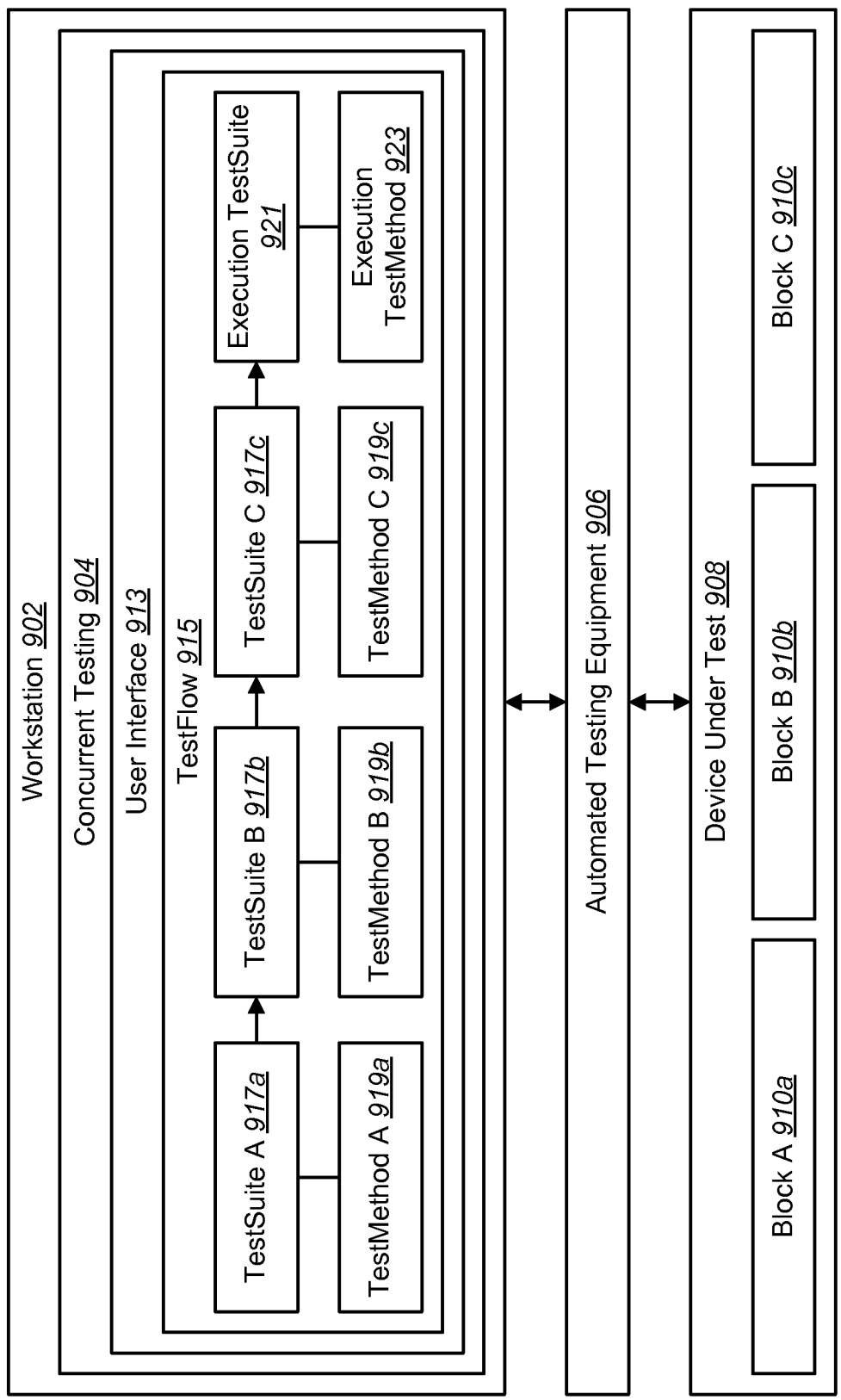
FIG. 9 is a block diagram illustrating one example of a workstation wherein systems and methods for enabling concurrent testing may be implemented.

FIG. 9 is a block diagram illustrating one example of a workstation 902 wherein systems and methods for enabling concurrent testing may be implemented. Examples of a workstation 902 include a desktop computer, laptop computer, server or other computing device. The workstation 902 communicates with the automated testing equipment (ATE) 906. The ATE 906 may communicate with and/or test a device under test (DUT) 908. The DUT 908 may include a plurality of blocks 910. In this example, the DUT 908 includes block A 910*a*, block B 910*b* and block C 910*c*.

The workstation 902 may include a concurrent testing module 904. The concurrent testing module 904 may include functionality that enables concurrent testing of multiple blocks 910*a-c* on the DUT 908. The concurrent testing module 904 may include a user interface 913. For example, the user interface 913 may be a Graphical User Interface (GUI) that allows a user to interact with the workstation 902.

The user interface 913 may include and/or display a Test-Flow 915. The TestFlow 915 may display one or more tests to be performed on the DUT 908 using the ATE 906. In this example, the TestFlow 915 includes TestSuite A 917*a*, TestSuite B 917*b*, TestSuite C 917*c* and an execution TestSuite 921. TestSuites A 917*a*, B 917*b*, C 917*c* and the execution TestSuite 921 may be respectively linked to TestMethod A 919*a*, TestMethod B 919*b*, TestMethod C 919*c* and an execution TestMethod 923. The TestMethods 919, 923 may provide instructions and/or code for the tests associated with each TestSuite 917, 921.

In this example, TestSuite A 917*a* (and TestMethod A 919*a*) corresponds to block A 910*a*, TestSuite B 917*b* (and TestMethod B 919*b*) corresponds to block B 910*b* and TestSuite C 917*c* (and TestMethod C 919*c*) corresponds to block C 910*c*. The workstation 902 may execute TestSuites A-C 917*a-c* in sequence. According to the systems and methods disclosed herein, actual execution of tests corresponding to TestMethods A-C 919*a-c* may be deferred until the execution TestSuite 921 and execution TestMethod 923 (which may be similar to Exec_Conc_TM( ) described above). For example, as each of TestSuites A-C 917*a-c* is executed, a test object 226 is generated using the corresponding TestMethods A-C 919*a-c*. These test objects 226 are added to a queue 224 object.

When execution reaches the execution TestSuite 921, the execution TestMethod 923 executes all of the test objects 226 in the queue 224. For example, instructions, data and/or other information corresponding to the test objects 224 is/are sent to the ATE 906, which performs the corresponding tests concurrently. Thus, block A 910*a*, block B 910*b* and block C 910*c* may be tested concurrently. For example, the tests being performed on blocks A-C 910*a-c* may overlap in time. The tests may be begun at or at about the same time in one configuration. In the same or another configuration, each test may be run on a different thread on the workstation 902.

Figure 10:
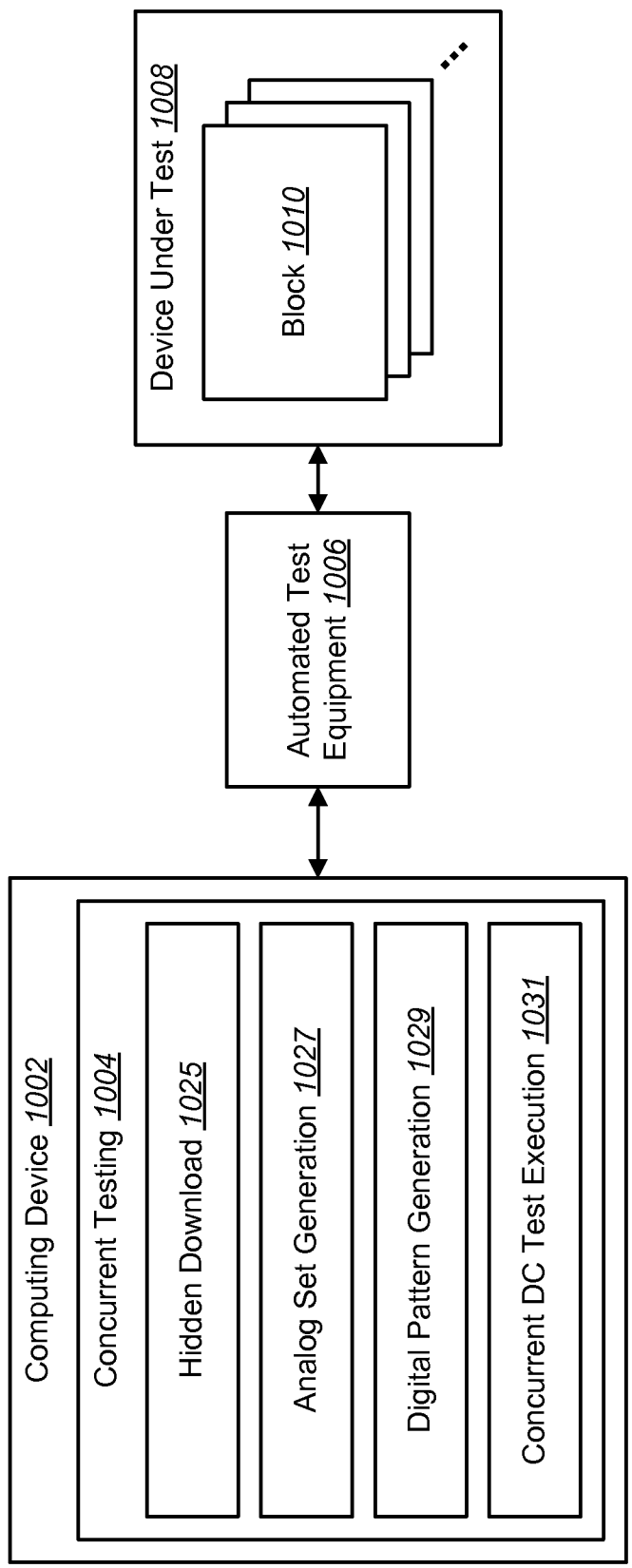
FIG. 10 is a block diagram illustrating another configuration of a computing device in which systems and methods for enabling concurrent testing may be implemented.

FIG. 10 is a block diagram illustrating another configuration of a computing device 1002 in which systems and methods for enabling concurrent testing may be implemented. The computing device 1002 may communicate with an ATE 1006, which may communicate with a DUT 1008 with multiple blocks 1010. The computing device 1002 may include a concurrent testing module 1004. The concurrent testing module 1004 may optionally include a hidden download module 1025, an analog set generation module 1027, a digital pattern generation module 1029 and/or a concurrent Direct Current (DC) test execution module 1031.

The hidden download module 1025 may allow the computing device 1002 to download captured analog data from the ATE 1006. The download may be "hidden," meaning that the data may be received during test execution as a background process. In one configuration, the hidden download module 1025 (or "hidden-upload module") takes advantage of a standard SmartCalc feature distributed with SmarTest to apply it to concurrent tests. SmartCalc allows hidden download (or upload from an instrument) and post-processing of data. This means that an instrument may upload the captured data to the computing device 102 for post-processing in the background while other tests or instruments are running This module allows using this feature with the concurrent framework to have a seamless transition.

The analog set generation module 1027 may be used to automatically generate analog sets that are used to execute concurrent analog and Radio Frequency (RF) tests. For example, the analog set generation module 1027 may generate analog set information that the ATE 1006 may use to concurrently perform analog tests and RF tests. This analog set information may be sent to the ATE 1006. In one configuration, the analog set generation module (or "Analog Builder") 1027 may allow merging multiple analog definitions into one for a single execution multi-capture. It may be used with the concurrency framework to integrate the analog definitions used in separate tests grouped to be executed concurrently. This may use standard SmarTest Analog API coding to generate the definitions (rather than the conventional GUI method), for example.

The input to the analog set generation module 1027 may be a set of analog instructions) and a queue 224 (e.g., CTests queue) or queue content. The analog set generation module 1027 may interrogate each test object 226 inside the queue 224 to determine the nature of each test object 226 (e.g., whether it is an RF transmit test, an RF receive test, a low frequency (LF) analog test (e.g., Baseband (BB) test), a DC test, a digital test, etc.). Based on this investigation of the queue 224, the analog set generation module 1027 may generate an appropriate set of instructions that will be sent to ATE 106. All tests of the same nature may be stacked serially, one after the other. All tests of different natures may be stacked in parallel. Listing 7 illustrates one example.

Listing 7

| |
|---|
| RF TX test 1 → RF TX test 2 → RF TX test 3 |
| RF RX test 1 → RF RX test 2 → RF RX test 3 |
| LF BB test 1 → LF BB test 2 → LF BB test 3 |

The analog set generation module 1027 may ignore DC and digital test setups, since they are not relevant to the analog instruction set of the ATE 106.

The digital pattern generation module 1029 may automatically generate digital patterns used to execute concurrent tests. For example, the digital pattern generation module 1029 may be used to generate digital test patterns that the ATE 1006 may use to concurrently test multiple blocks 1010 using the digital test patterns. The digital patterns may be sent to the ATE 1006. In one configuration, the digital pattern generation module 1029 may employ a similar concept as the Analog Builder, but used for digital patterns. A digital pattern is a stream of digital data defined in a per-pin basis. Patterns are use to drive (or capture) digital data through the ATE 106 digital channels, which is used to configure the DUT 108 and communicate with it. In a conventional TestFlow, each TestSuite has an associated pattern. This module 1029 may allow taking the patterns of multiple tests and merging them into a single one to execute tests concurrently. It may use multi-port burst patterns, which are subsets of patterns defined for a reduced set of pins, specific to the target test.

The input to the digital pattern generation module 1029 may be a set of digital patterns and an array of existing patterns determined by each test object 226 in the queue 224 (e.g., CTests queue). The digital pattern generation module 1029 may interrogate each test object's pattern by digital pin grouping. If the pin groups are the same, the patterns may be stacked serially. If the pin groups are different, the patterns may be stacked in parallel.

In one configuration, the multi-port burst patterns may be implemented as follows. Multiple variables may be specified or defined in an execution TestSuite. For example, a concurrent burst label name in a CCT_BurstLablelName string variable may be specified. Furthermore, an autoGenCCTBurstLabel flag may be set. For instance, the flag may be set to type "1" if a label is desired to be created for the first time or an existing CCT_BurstLabelName is desired to be re-written. The flag may be set to type "0" if a CCT_BurstLabelName has already been created or customized and the CCT_BurstLabelName is not desired to be modified.

The digital pattern generation module 1029 may assemble a "Concurrent Burst Label" from individual test suite burst labels (e.g., similar to a multi-port burst tool). The concurrent burst label may be depicted as a table of individual burst labels. For instance, the concurrent burst label may reflect a structure for digital patterns used in testing. If the burst patterns share the same port, the burst patterns may be added serially to the concurrent burst label (e.g., in a single column). If the burst patterns do not share the same port, then the burst patterns may be added in parallel (e.g., in different columns) to the concurrent burst label. "Dumb" or "wait" patterns may also be added to align certain bursts. In other words, the digital pattern generation module 1029 may insert or adjust the length of a dumb or wait pattern to finish when a sister port pattern finishes in the time domain. In some instances, a user may also be permitted to adjust patterns. For instance, a user may manually add dumb or wait patterns or remove patterns that provide redundant functionality to the concurrent test.

The concurrent DC test execution module 1031 may be used to execute concurrent DC tests that are supported by the concurrent testing module 1004. For example, DC tests may be a special case in the Verigy 93K ATE 106, because rather than using a separate independent instrument to perform a measurement, they may use instrumentation behind the digital channels used by the ATE 106 to drive patterns. Accordingly, concurrency for DC may require a special treatment which this module 1031 facilitates.

Figure 11:
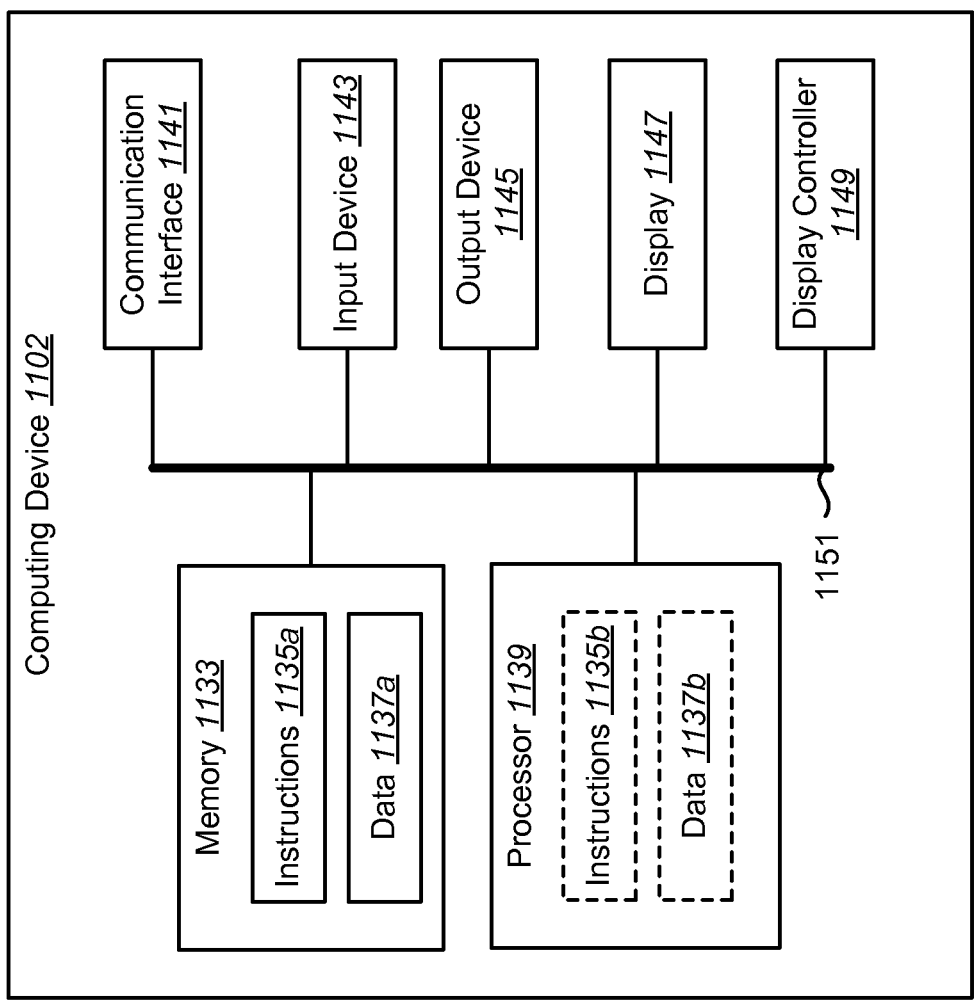
FIG. 11 illustrates various components that may be utilized in a computing device.

FIG. 11 illustrates various components that may be utilized in a computing device 1102. The illustrated components may be located within the same physical structure or in separate housings or structures. The computing devices 102, 702, 902 (workstation), 1002 discussed in relation to FIGS. 1, 7, 9 and 10 may be configured similarly to the computing device 1102. The computing device 1102 includes a processor 1139. The processor 1139 may be a general purpose single- or multi-chip microprocessor (e.g., an ARM), a special purpose microprocessor (e.g., a digital signal processor (DSP)), a microcontroller, a programmable gate array, etc. The processor 1139 may be referred to as a central processing unit (CPU). Although just a single processor 1139 is shown in the computing device 1102 of FIG. 11, in an alternative configuration, a combination of processors (e.g., an ARM and DSP) could be used.

The computing device 1102 also includes memory 1133 in electronic communication with the processor 1139. That is, the processor 1139 can read information from and/or write information to the memory 1133. The memory 1133 may be any electronic component capable of storing electronic information. The memory 1133 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers and so forth, including combinations thereof.

Data 1137*a* and instructions 1135*a* may be stored in the memory 1133. The instructions 1135*a* may include one or more programs, routines, sub-routines, functions, procedures, etc. The instructions 1135*a* may include a single computer-readable statement or many computer-readable statements. The instructions 1135*a* may be executable by the processor 1139 to implement the methods 400, 500, 600 that were described above. Executing the instructions 1135*a* may involve the use of the data 1137*a* that is stored in the memory 1133. FIG. 11 shows some instructions 1135*b* and data 1137*b* being loaded into the processor 1139.

The computing device 1102 may also include one or more communication interfaces 1141 for communicating with other electronic devices. The communication interfaces 1141 may be based on wired communication technology, wireless communication technology, or both. Examples of different types of communication interfaces 1141 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1102 may also include one or more input devices 1143 and one or more output devices 1145. Examples of different kinds of input devices 1143 include a keyboard, mouse, microphone, remote control device, button, joystick, trackball, touchpad, lightpen, etc. Examples of different kinds of output devices 1145 include a speaker, printer, etc. One specific type of output device which may be typically included in a computing device 1102 is a display device 1147. Display devices 1147 used with configurations disclosed herein may utilize any suitable image projection technology, such as a cathode ray tube (CRT), liquid crystal display (LCD), light-emitting diode (LED), gas plasma, electroluminescence, or the like. A display controller 1149 may also be provided, for converting data stored in the memory 1133 into text, graphics, and/or moving images (as appropriate) shown on the display device 1147.

The various components of the computing device 1102 may be coupled together by one or more buses, which may include a power bus, a control signal bus, a status signal bus, a data bus, etc. For simplicity, the various buses are illustrated in FIG. 11 as a bus system 1151. It should be noted that FIG. 11 illustrates only one possible configuration of a computing device 1102. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for enabling concurrent testing, comprising:
   generating a plurality of test objects on a computing device, wherein:
   the plurality of test objects is generated using derived classes that are based on a base test class;
   the plurality of test objects are sequenced to enable a dynamic selection, during at least a program run-time, of one or more tests; and
   each of the plurality of test objects corresponds to a separate block in a Device Under Test (DUT);
   adding, on the computing device, the plurality of test objects to a queue;
   sending information based on the plurality of test objects to an Automated Test Equipment (ATE); and
   causing the ATE to concurrently test the separate blocks in the DUT in parallel using the plurality of test objects in the queue.

2. The method of claim 1, wherein causing the ATE to concurrently test comprises sending an instruction to begin concurrent testing.

3. The method of claim 1, further comprising initializing an ATE instrument.

4. The method of claim 1, further comprising determining a compatible execution mode for the plurality of test objects.

5. The method of claim 1, further comprising performing testing cleanup.

6. The method of claim 1, further comprising receiving test data.

7. The method of claim 1, further comprising performing post-processing, comprising performing calculations using received test data.

8. The method of claim 1, further comprising performing datalogging.

9. The method of claim 1, further comprising disposing of the plurality of test objects.

10. The method of claim 1, wherein the base test class includes initialization, cleanup, post-processing and datalogging functions that are implemented by the derived classes.

11. The method of claim 1, further comprising executing each of the test objects using a separate thread.

12. The method of claim 1, wherein the DUT comprises an object to be concurrently tested that comprises one of the group consisting of an integrated circuit and a group of integrated circuits.

13. The method of claim 1, wherein the plurality of test objects is generated according to a user interface sequence.

14. The method of claim 1, further comprising receiving test data using a background process.

15. The method of claim 1, further comprising generating one or more analog sets for use in concurrent testing.

16. The method of claim 1, further comprising generating one or more digital patterns for use in concurrent testing.

17. The method of claim 1, wherein the separate blocks are concurrently tested using any of digital, mixed signal, Radio Frequency (RF) and Direct Current (DC) tests.

18. The method of claim 1, wherein the queue is based on a queue class, wherein the queue class includes a function that controls execution of the test objects in the queue.

19. The method of claim 1, wherein the test objects in the queue are serially executable without rewriting code.

20. A computing device for enabling concurrent testing, comprising:
a processor;
memory in electronic communication with the processor;
instructions stored in the memory, the instructions being executable to:
generate a plurality of test objects, wherein:
the plurality of test objects is generated using derived classes that are based on a base test class;
the plurality of test objects are sequenced to enable a dynamic selection, during at least a program run-time, of one or more tests; and
each of the plurality of test objects corresponds to a separate block in a Device Under Test (DUT);
add the plurality of test objects to a queue;
send information based on the plurality of test objects to an Automated Test Equipment (ATE); and
cause the ATE to concurrently test the separate blocks in parallel in the DUT using the plurality of test objects in the queue.

21. The computing device of claim 20, wherein causing the ATE to concurrently test comprises using a function that causes execution of the plurality of test objects in the queue.

22. The computing device of claim 20, wherein the instructions are further executable to initialize an ATE instrument.

23. The computing device of claim 20, wherein the instructions are further executable to determine a compatible execution mode for the plurality of test objects.

24. The computing device of claim 20, wherein the instructions are further executable to perform testing cleanup.

25. The computing device of claim 20, wherein the instructions are further executable to receive test data.

26. The computing device of claim 20, wherein the instructions are further executable to perform post-processing, comprising performing calculations using received test data.

27. The computing device of claim 20, wherein the instructions are further executable to perform datalogging.

28. The computing device of claim 20, wherein the instructions are further executable to dispose of the plurality of test objects.

29. The computing device of claim 20, wherein the base test class includes initialization, cleanup, post-processing and datalogging functions that are implemented by the derived classes.

30. The computing device of claim 20, wherein the instructions are further executable to execute each of the test objects using a separate thread.

31. The computing device of claim 20, wherein the DUT comprises an object to be concurrently tested that comprises one of the group consisting of an integrated circuit and a group of integrated circuits.

32. The computing device of claim 20, wherein the plurality of test objects is generated according to a user interface sequence.

33. The computing device of claim 20, wherein the instructions are further executable to receive test data using a background process.

34. The computing device of claim 20, wherein the instructions are further executable to generate one or more analog sets for use in concurrent testing.

35. The computing device of claim 20, wherein the instructions are further executable to generate one or more digital patterns for use in concurrent testing.

36. The computing device of claim 20, wherein the separate blocks are concurrently tested using any of digital, mixed signal, Radio Frequency (RF) and Direct Current (DC) tests.

37. The computing device of claim 20, wherein the queue is based on a queue class, wherein the queue class includes a function that controls execution of the test objects in the queue.

38. The computing device of claim 20, wherein the test objects in the queue are serially executable without rewriting code.

39. A computer-program product for enabling concurrent testing comprising a non-transitory tangible computer-readable medium having instructions thereon, the instructions comprising:
code for causing a computing device to generate a plurality of test objects, wherein:
the plurality of test objects is generated using derived classes that are based on a base test class;
the plurality of test objects are sequenced to enable a dynamic selection, during at least a program run-time, of one or more tests; and
each of the plurality of test objects corresponds to a separate block in a Device Under Test (DUT);
code for causing the computing device to add the plurality of test objects to a queue;
code for causing the computing device to send information based on the plurality of test objects to an Automated Test Equipment (ATE); and
code for causing the computing device to cause the ATE to concurrently test the separate blocks in the DUT in parallel using the plurality of test objects in the queue.

40. The computer-program product of claim 39, wherein the base test class includes initialization, cleanup, post-processing and datalogging functions that are implemented by the derived classes.

41. The computer-program product of claim 39, wherein the queue is based on a queue class.

42. An apparatus for enabling concurrent testing, comprising:
means for generating a plurality of test objects, wherein:
the plurality of test objects is generated using derived classes that are based on a base test class;
the plurality of test objects are sequenced to enable a dynamic selection, during at least a program run-time, of one or more tests; and
each of the plurality of test objects corresponds to a separate block in a Device Under Test (DUT);
means for adding the plurality of test objects to a queue;
means for sending information based on the plurality of test objects to an Automated Test Equipment (ATE); and
means for causing the ATE to concurrently test the separate blocks in the DUT in parallel using the plurality of test objects in the queue.

43. The apparatus of claim 42, wherein the base test class includes initialization, cleanup, post-processing and datalogging functions that are implemented by the derived classes.

44. The apparatus of claim 42, wherein the queue is based on a queue class.

* * * * *